(12) United States Patent
Nishimura et al.

(10) Patent No.: US 8,205,030 B2
(45) Date of Patent: Jun. 19, 2012

(54) COMPOSITE TYPE RECORDING APPARATUS, DATA WRITING METHOD AND DATA WRITING PROGRAM

(75) Inventors: Hajime Nishimura, Kanagawa (JP); Takeshi Sasa, Miyagi (JP); Tetsuya Tamura, Kanagawa (JP); Kazuya Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 811 days.

(21) Appl. No.: 11/459,107

(22) Filed: Jul. 21, 2006

(65) Prior Publication Data

US 2007/0050583 A1 Mar. 1, 2007

(30) Foreign Application Priority Data

Jul. 25, 2005 (JP) ................. P2005-215106

(51) Int. Cl.
*G06F 12/00* (2006.01)
(52) U.S. Cl. ............ 711/4; 711/129; 711/145; 711/153; 711/154; 711/173; 711/205; 711/206; 711/207; 711/E12.001; 711/E12.002
(58) Field of Classification Search ............. 711/4, 129, 711/145, 153, 154, 173, 205, 206, 207, E12.001, 711/E12.002
See application file for complete search history.

(56) References Cited

U.S. PATENT DOCUMENTS 6,374,315 B1 * 4/2002 Okada et al. .................... 710/62
2001/0014933 A1 * 8/2001 Shibazaki et al. ............ 711/154

FOREIGN PATENT DOCUMENTS

| JP | 2000-090004 | 3/2000 |
| JP | 2003-125358 | 4/2003 |
| JP | 2005-078514 | 3/2005 |
| JP | 2005-302152 | 10/2005 |

* cited by examiner

*Primary Examiner* — Midys Rojas
(74) *Attorney, Agent, or Firm* — SNR Denton US LLP

(57) ABSTRACT

There is provided a composite type recording apparatus restricting write operations depending on the type of a connected host apparatus, including a recording medium having a first data region, a non-volatile storage medium having a second data region and an identification information table for integrating and managing the first and second data region, an information selection section for selecting positional information having predetermined identification information from the identification information table according to the type of the host apparatus, a conversion section for converting positional information selected by the information selection section into positional information matching the first data region or positional information matching the second data region, a first write section for writing data supplied from the host apparatus in the first data region according to conversion process of the conversion section and a second write section for writing data supplied from the host apparatus in the second data region.

3 Claims, 14 Drawing Sheets

| FAT value (hexadecimal number) | Meaning |
|---|---|
| 0000h | Corresponding cluster is in empty state. |
| 0002h~FFF6h | Corresponding cluster is in "allocated out" state. Corresponding value is cluster number to be continued. |
| FFF7h | This indicates "defective cluster". |
| FFF8h~FFFFh | Corresponding cluster is in "allocated out" state. This indicates end of file (EOF). |

| Name | Extension | Attribute | Reserved | Recording time | Recording date | Leading cluster number | File length |
|---|---|---|---|---|---|---|---|
| 8 bytes | 3 bytes | 1 byte | 10 bytes | 2 bytes | 2 bytes | 2 bytes | 4 bytes |

FIG.5

COMPOSITE TYPE RECORDING APPARATUS, DATA WRITING METHOD AND DATA WRITING PROGRAM

CROSS REFERENCES TO RELATED APPLICATIONS

The present invention contains subject matter related to Japanese Patent Application JP 2005-215106 filed in the Japanese Patent Office on Jul. 25, 2005, the entire contents of which being incorporated herein by reference.

BACKGROUND OF THE INVENTION

1. Field of the Invention

The present invention relates to a composite type recording apparatus including a recording medium and a non-volatile storage medium and adapted to write and read data according to a common file system and also to a data writing method and a data writing program for writing data to such a composite type recording apparatus.

2. Description of the Related Art

Hard disc drives (to be referred to as HDDs hereinafter) have been and are being used as external storages of personal computers (PCs). As the recording density of HDDs is improved, they are made to have a larger capacity. Large capacity HDDs are finding and expected to find applications in consumer level AV appliances such as AV home servers and electronic appliances mounted in cars.

In the current trend of downsizing the discs of HDDs, HDDs dimensionally in the order of 1.8 inches and 1 inch are expected to find applications in the field of mobile appliances such as digital still cameras (DSCs) and portable music players.

On the other hand, non-volatile semiconductor memories such as flash memories provide advantages including a low power consumption rate, a quick start feature and a high impact-resistance and large capacity non-volatile semiconductor memories with a memory capacity exceeding 1 GB have been developed. They are finding a variety of applications for their advantages.

Meanwhile, small storages to be used in mobile appliances particularly have to be available at low cost and show a high capacity, a low power consumption rate and a high responsiveness.

However, several seconds are necessary for HDDs after starting power supply to them until they get into an activated condition where they can record and reproduce data. On the other hand, non-volatile semiconductor memories are advantageous in terms of quick responsiveness of being able to be brought into an activated condition instantaneously. In short, a non-volatile semiconductor memory can record and reproduce data the instance when power is supplied to it.

If, on the other hand, an HDD is constantly held in an idling condition (a standby state for recording/reproduction), electric power is wasted to a significant extent to degrade the power consumption efficiency of mobile appliances whose power capacity is limited. Additionally, the HDD is accompanied by a disadvantage that the data transfer rate falls due to the use of an alternate process when a defective sector appears somewhere on the memory tracks.

Thus, development of hybrid storages of HDDs and non-volatile semiconductor memories that can offset the drawbacks of HDDs by means of the advantages of non-volatile semiconductor memories is expected. The inventors of the present invention have proposed a variety of arrangements for managing such hybrid storages by means of a single file system so as to fully exploit the potentials of such storages (see, inter alia, Patent Documents 1 through 4: Jpn. Pat. Appln. Laid-Open Publication Nos. 2003-123379, 2003-125358, 2002-150699 and 2000-324435).

For example, the system data necessary for accessing the software and the data to be used for controlling the HDD controller of an HDD has been stored in a predetermined region of the HDD and it is not possible to read out the system data until the HDD is activated. In other words, if power is supplied to an appliance where an HDD is mounted, it is not possible to use the appliance for some time after the start of power supply until the system data are read out from the HDD. In view of this problem, the above cited Patent Document 1 describes a technique for storing system data in a non-volatile semiconductor memory so as to make it possible to use the system data immediately after the start of power supply to the appliance.

As pointed out above, it takes several seconds for an HDD until it can record and reproduce data after the start of power supply and hence it is not possible for the HDD to record and reproduce data until it becomes active. In view of this problem, the above cited Patent Document 2 describes a technique of writing the data to be written in an HDD in a non-volatile semiconductor memory for a predetermined time period from the head thereof and subsequently, when the HDD is activated, writing the rest in the HDD in a data recording operation, while firstly reading the data written in the non-volatile semiconductor memory and subsequently, when the HDD is activated, reading the rest from the HDD in a data reproducing operation. With the arrangement of the Patent Document 2, it is possible to record and reproduce data immediately after the start of power supply to the appliance.

The above-cited Patent Document 3 describes a technique of preventing degradation of data transfer rate by utilizing a non-volatile semiconductor memory as spare region for a defective sector.

When an HDD is mounted in a video camera, there arises a risk of abruptly blocking the power supply when the video camera is dropped or otherwise subjected to impact while shooting an image. Then, it is no longer possible to reproduce the recorded data if a file system is not registered. To prevent such a situation from taking place, it is necessary to periodically update the file system in a predetermined region of the HDD but the operation of updating the file system remarkably reduces the data recording rate of the video camera. The Patent Document 4 describes a technique of protecting data without degrading the data transfer rate by assigning a region for updating the file system in the non-volatile semiconductor memory also mounted in the video camera.

In this way, it is possible to form a low cost and high performance storage by combining a small capacity non-volatile semiconductor memory and a large capacity HDD, utilizing the non-volatile semiconductor memory only as a data region to be used in a transitional condition and the HDD as a data region to be used in a steady state.

SUMMARY OF THE INVENTION

Meanwhile, in a hybrid storage, it is important to minimize the capacity of the non-volatile semiconductor memory and utilize it efficiently in order to reduce the cost thereof. Then, as a matter of course, the memory of the non-volatile semiconductor memory is wasted so that it is not possible to exploit the advantages of a hybrid storage if the host appliance that utilizes the hybrid storage consumes (write data in) the memory region of the non-volatile semiconductor memory without recognizing and discriminating the memory region of the HDD and that of the non-volatile semiconductor memory.

Host appliances to which hybrid storages can be applied include DSCs, portable music players and video cameras. DSCs and other appliances can be connected to PCs nowadays so that it is possible to read contents data stored in and write contents data to a storage medium of a DSC by way of a PC. It is also possible to connect a removable storage in which data are recorded by means of a DSC to a PC so as to read out data from and write data in the removable storage.

However, in general purpose appliances such as PCs, data are managed according to a predetermined file system and hence the general purpose appliance is unable to recognize the memory region of the non-volatile semiconductor memory and that of the HDD of a hybrid storage. In other words, general purpose appliances such as PCs can only recognize a hybrid storage as a single storage and hence it is only possible to arrange the recording operation of the appliance in such a way that the appliance starts recording data in the memory region of the non-volatile semiconductor memory of a hybrid storage and then in the memory region of the HDD when all the former memory region is fully consumed for recording data or when the HDD is activated. In the latter arrangement, the appliance returns to the non-volatile semiconductor memory when the memory region of the HDD is fully consumed for recording data. With either of the above-described arrangements, it is not possible to exploit the advantages of hybrid storage mediums.

There is also a demand for techniques of backing up management information for managing the data written in HDDs and non-volatile solid state memories and important data also written in such storage mediums in a simple manner.

In view of the above identified circumstances, it is therefore desirable to provide a composite type recording apparatus having both a non-volatile semiconductor memory region and an HDD memory region that can exploit the advantages of the combination of such memory regions for recording and reproducing data not only when the host appliance is a dedicated appliance such as DSC but also when the host appliance is a general purpose appliance such as PC and a data writing method and a data writing program for writing data in such a composite type recording apparatus.

According to an embodiment of the present invention, there is provided a composite type recording apparatus including: a recording medium having a first data region with a first physical address affixed thereto; a non-volatile storage medium having a second data region with a second physical address affixed thereto; an interface section to be connected to a host apparatus; a recognition means for recognizing the host apparatus connected to the interface section; an information selection means for selecting a logical address with predetermined identification information written thereto according to the outcome of recognition of the recognition means and an identification information table formed by logical addresses for managing the first physical address and the second physical address, part of the first physical address and part of the second physical address being formed by a same logical address, predetermined identification information being written at each of the logical addresses; a conversion means for converting the logical address selected by the information selection means into a predetermined first physical address corresponding to the first data region and a predetermined second physical address corresponding to the second data region; a data allocation means for allocating the data supplied from the host apparatus connected to the interface section to the first data region or the second data region according to the conversion process by the conversion means; and a write means for writing the data allocated to the first data region by the data allocation means at a predetermined location of the first data region according to the first physical address and/or the data allocated to the second data region by the data allocation means at a predetermined location of the second data region according to the second physical address.

According to an embodiment of the present invention, there is also provided a data writing method of writing data in a composite type recording apparatus having a recording medium including a first data region and a second data region with a first physical address affixed thereto, a non-volatile storage medium including a third data region and a fourth data region with a second physical address affixed thereto and an interface section to be connected to a host apparatus, the method including: a recognition step of recognizing the host apparatus connected to the interface section; an information selection step of selecting a logical address with predetermined identification information written thereto according to the outcome of recognition of the recognition step and an identification information table formed by logical addresses for managing the first physical address and the second physical address, part of the first physical address and part of the second physical address being formed by a same logical address, predetermined identification information being written at each of the logical addresses; a conversion step of converting the logical address selected in the information selection step into a predetermined first physical address corresponding to the first data region and a predetermined second physical address corresponding to the second data region; a data allocation step of allocating the data supplied from the host apparatus connected to the interface section to the first data region or the second data region according to the conversion process in the conversion step; and a write step of writing the data allocated to the first data region in the data allocation step at a predetermined location of the first data region according to the first physical address and/or the data allocated to the second data region in the data allocation step at a predetermined location of the second data region according to the second physical address.

According to an embodiment of the present invention, there is also provided a program for causing a computer to execute a process of writing data in a composite type recording apparatus having a recording medium including a first data region and a second data region with a first physical address affixed thereto, a non-volatile storage medium including a third data region and a fourth data region with a second physical address affixed thereto and an interface section to be connected to a host apparatus, the program including: a recognition step of recognizing the host apparatus connected to the interface section; an information selection step of selecting a logical address with predetermined identification information written thereto according to the outcome of recognition of the recognition step and an identification information table formed by logical addresses for managing the first physical address and the second physical address, part of the first physical address and part of the second physical address being formed by a same logical address, predetermined identification information being written at each of the logical addresses; a conversion step of converting the logical address selected in the information selection step into a predetermined first address corresponding to the first data region and a predetermined second physical address corresponding to the second data region; a data allocation step of allocating the data supplied from the host apparatus connected to the interface section to the first data region or the second data region according to the conversion process in the conversion step; and a write step of writing the data allocated to the first data region in the data allocation step at a predetermined location of the first data region according to the first physical address and/or the data allocated to the second data region in the data allocation step at a predetermined location of the second data region according to the second physical address.

According to an embodiment of the present invention, there is also provided a composite type recording apparatus including: a recording medium having a first data region with a first physical address affixed thereto; a non-volatile storage medium having a second data region with a second physical address affixed thereto; an interface section to be connected to a host apparatus; a recognition means for recognizing the host apparatus connected to the interface section; an identification information table read means for reading a first identification information table formed by logical addresses for managing the first physical address and the second physical address, part of the first physical address and part of the second physical address being formed by a same logical address, the first identification information table containing identification information written thereto of rejecting writing data at the logical addresses, or a second identification information table formed by the first identification information table and a logical address corresponding to the second physical address out of the logical addresses, predetermined identification information being written at each of the logical addresses; an information selection means for selecting a logical address with predetermined identification information written thereat according to the first identification information table or the first identification information table and the second identification information table read out by the identification information table read means; a conversion means for converting the logical address selected by the information selection means into a predetermined first address corresponding to the first data region and a predetermined second physical address corresponding to the second data region; a data allocation means for allocating the data supplied from the host apparatus connected to the interface section to the first data region or the second data region according to the conversion process by the conversion means; and a write means for writing the data allocated to the first data region by the data allocation means at a predetermined location of the first data region according to the first physical address and/or the data allocated to the second data region by the data allocation means at a predetermined location of the second data region according to the second physical address.

According to an embodiment of the present invention, there is also provided a data writing method of writing data in a composite type recording apparatus having a recording medium including a first data region and a second data region with a first physical address affixed thereto, a non-volatile storage medium including a third data region and a fourth data region with a second physical address affixed thereto and an interface section to be connected to a host apparatus, the method including: a recognition step of recognizing the host apparatus connected to the interface section; an identification information table read step of reading a first identification information table formed by logical addresses for managing the first physical address and the second physical address, part of the first physical address and part of the second physical address being formed by a same logical address, the first identification information table containing identification information written thereto of rejecting writing data at the logical addresses, or a second identification information table formed by the first identification information table and a logical address corresponding to the second physical address out of the logical addresses, predetermined identification information being written at each of the logical addresses; an information selection step of selecting a logical address with predetermined identification information written thereat according to the first identification information table or the first identification information table and the second identification information table read out in the identification information table read step; a conversion step of converting the logical address selected in the information selection step into a predetermined first physical address corresponding to the first data region and a predetermined second physical address corresponding to the second data region; a data allocation step of allocating the data supplied from the host apparatus connected to the interface section to the first data region or the second data region according to the conversion process in the conversion step; and a write step of writing the data allocated to the first data region in the data allocation step at a predetermined location of the first data region according to the first physical address and/or the data allocated to the second data region in the data allocation step at a predetermined location of the second data region according to the second physical address.

According to an embodiment of the present invention, there is also provided a program for causing a computer to execute a process of writing data in a composite type recording apparatus having a recording medium including a first data region and a second data region with a first physical address affixed thereto, a non-volatile storage medium including a third data region and a fourth data region with a second physical address affixed thereto and an interface section to be connected to a host apparatus, the program including: a recognition step of recognizing the host apparatus connected to the interface section; an identification information table read step of reading a first identification information table formed by logical addresses for managing the first physical address and the second physical address, part of the first physical address and part of the second physical address being formed by a same logical address, the first identification information table containing identification information written thereto of rejecting writing data at the logical addresses, or a second identification information table formed by the first identification information table and a logical address corresponding to the second physical address out of the logical addresses, predetermined identification information being written at each of the logical addresses; an information selection step of selecting a logical address with predetermined identification information written thereat according to the first identification information table or the first identification information table and the second identification information table read out in the identification information table read step; a conversion step of converting the logical address selected in the information selection step into a predetermined first physical address corresponding to the first data region and a predetermined second physical address corresponding to the second data region; a data allocation step of allocating the data supplied from the host apparatus connected to the interface section to the first data region or the second data region according to the conversion process in the conversion step; and a write step of writing the data allocated to the first data region in the data allocation step at a predetermined location of the first data region according to the first physical address and/or the data allocated to the second data region in the data allocation step at a predetermined location of the second data region according to the second physical address.

According to an embodiment of the present invention, there is also provided a composite type recording apparatus including: a recording medium having a first data region with a first physical address affixed thereto; a non-volatile storage medium having a second data region with a second physical address affixed thereto; an interface section to be connected to a host apparatus; a recognition means for recognizing the host apparatus connected to the interface section; an identification information table read means for reading a first identification information table formed by a first logical address corresponding to the first physical address and containing predetermined identification information written at the first logical address and a second identification information table formed by a second logical address corresponding to the second physical address with an address identical with part of the first logical address affixed thereto according to the outcome of recognition by the recognition means; a first information selection means for selecting the first logical address with predetermined identification information written thereat from the first identification information table read out by the identification information table read means; a second information selection means for selecting the second logical address with predetermined identification information written thereat from the second identification information table read out by the identification information table read means according to the outcome of recognition by the recognition means; a conversion table generation means for generating a conversion table associating the first logical address selected by the first information selection means and the second logical address selected by the second information selection means with each other; a conversion means for converting the first logical address selected by the first information selection means into a predetermined first physical address corresponding to the first data region and the second logical address selected by the second information selection means into a predetermined second physical address corresponding to the second data region; a data allocation means for allocating the data supplied from the host apparatus connected to the interface section to the first data region or the second data region according to the conversion process by the conversion means; a first write means for writing the data allocated to the first data region by the data allocation means at a predetermined location of the first data region according to the first physical address produced by the conversion by the conversion means; a second write means for writing the data allocated to the second data region by the data allocation means at a predetermined location of the second data region according to the second physical address produced by the conversion by the conversion means; and a third write means for writing the data written in the second data region by the second write means at a predetermined location of the first data region according to the conversion table generated by the conversion table generation means.

According to an embodiment of the present invention, there is also provided a data writing method of writing data in a composite type recording apparatus having a recording medium including a first data region with a first physical address affixed thereto, a non-volatile storage medium including a second data region with a second physical address affixed thereto and an interface section to be connected to a host apparatus, the method including: a recognition step of recognizing the host apparatus connected to the interface section; an identification information table read step of reading a first identification information table formed by a first logical address corresponding to the first physical address and containing predetermined identification information written at the first logical address and a second identification information table formed by a second logical address corresponding to the second physical address with an address identical with part of the first logical address affixed thereto and containing predetermined identification information written at the second logical address according to the outcome of recognition in the recognition step; a first information selection step of selecting the first logical address with predetermined identification information written thereat from the first identification information table read out in the identification information table read step; a second information selection step of selecting the second logical address with predetermined identification information written thereat from the second identification information table read out in the identification information table read step according to the outcome of recognition in the recognition step; a conversion table generation step of generating a conversion table associating the first logical address selected in the first information selection step and the second logical address selected in the second information selection step with each other; a conversion step of converting the first logical address selected in the first information selection step into a predetermined first physical address corresponding to the first data region and the second logical address selected in the second information selection step into a predetermined second physical address corresponding to the second data region; a data allocation step of allocating the data supplied from the host apparatus connected to the interface section to the first data region or the second data region according to the conversion process in the conversion step; a first write step of writing the data allocated to the first data region in the data allocation step at a predetermined location of the first data region according to the first physical address produced by the conversion in the conversion step; a second write step of writing the data allocated to the second data region in the data allocation step at a predetermined location of the second data region according to the second physical address produced by the conversion in the conversion step; and a third write step of writing the data written in the second data region in the second write step at a predetermined location of the first data region according to the conversion table generated in the conversion table generation step.

According to an embodiment of the present invention, there is also provided a program for causing a computer to execute a process of writing data in a composite type recording apparatus having a recording medium including a first data region with a first physical address affixed thereto, a non-volatile storage medium including a second data region with a second physical address affixed thereto and an interface section to be connected to a host apparatus, the program including: a recognition step of recognizing the host apparatus connected to the interface section; an identification information table read step of reading a first identification information table formed by a first logical address corresponding to the first physical address and containing predetermined identification information written at the first logical address and a second identification information table formed by a second logical address corresponding to the second physical address with an address identical with part of the first logical address affixed thereto and containing predetermined identification information written at the second logical address according to the outcome of recognition in the recognition step; a first information selection step of selecting the first logical address with predetermined identification information written thereat from the first identification information table read out in the identification information table read step; a second information selection step of selecting the second logical address with predetermined identification information written thereat from the second identification information table read step according to the outcome of recognition in the recognition step; a conversion table generation step of generating a conversion table associating the first logical address selected in the first information selection step and the second logical address selected in the second information selection step with each other; a conversion step of converting the first logical address selected in the first information selection step into a predetermined first physical address corresponding to the first data region and the second logical address selected in the second information selection step into a predetermined second physical address corresponding to the second data region; a data allocation step of allocating the data supplied from the host apparatus connected to the interface section to the first data region or the second data region according to the conversion process in the conversion step; a first write step of writing the data allocated to the first data region in the data allocation step at a predetermined location of the first data region according to the first physical address produced by the conversion in the conversion step; a second write step of writing the data allocated to the second data region in the data allocation step at a predetermined location of the second data region according to the second physical address produced by the conversion in the conversion step; and a third write step of writing the data written in the second data region in the second write step at a predetermined location of the first data region according to the conversion table generated in the conversion table generation step.

Thus, a composite type recording apparatus according to an embodiment of the present invention restricts write operations depending on the type of the host apparatus so that if the host apparatus is a general purpose apparatus and writing data, no data is written in the data region of the non-volatile storage medium until all the data region of the recording medium is "allocated out". Therefore, after data are written in a composite type recording apparatus according to an embodiment of the present invention by a general purpose apparatus, a dedicated apparatus can write data in the composite type recording apparatus, exploiting both the characteristic features of a recording medium that operates at low bit cost and those of a non-volatile storage medium that are advantageous in terms of quick responsiveness, low power consumption rate and so on.

A data writing method and a data writing program according to an embodiment of the present invention are adapted to write data in a composite type recording apparatus that restricts write operations depending on the type of the host apparatus so that if the host apparatus is a general purpose apparatus and writing data, no data is written in the data region of the non-volatile storage medium until all the data region of the recording medium is "allocated out". Therefore, after data are written in a composite type recording apparatus according to an embodiment of the present invention by a general purpose apparatus, a dedicated apparatus can write data in the composite type recording apparatus by means of the data writing method or the data writing program, exploiting both the characteristic features of a recording medium that operates at low bit cost and those of a non-volatile storage medium that are advantageous in terms of quick responsiveness, low power consumption rate and so on.

Additionally, a composite type recording apparatus according to an embodiment of the present invention restricts write operations in the data region of the non-volatile storage medium depending on the type of the host apparatus so that if the host apparatus is a general purpose apparatus and writing data, any operation of writing data in the data region of the non-volatile storage medium is prohibited and hence no data is written there. Therefore, after data are written in a composite type recording apparatus according to an embodiment of the present invention by a general purpose apparatus, a dedicated apparatus can write data in the composite type recording apparatus, exploiting both the characteristic features of a recording medium that operates at low bit cost and those of a non-volatile storage medium that are advantageous in terms of quick responsiveness, low power consumption rate and so on.

Additionally, a data writing method and a data writing program according to an embodiment of the present invention are adapted to write data in a composite type recording apparatus that restricts write operations depending on the type of the host apparatus so that if the host apparatus is a general purpose apparatus and writing data, any operation of writing data in the data region of the non-volatile storage medium is prohibited and hence no data is written there. Therefore, after data are written in a composite type recording apparatus according to an embodiment of the present invention by a general purpose apparatus, a dedicated apparatus can write data in the composite type recording apparatus by means of the data writing method or the data writing program, exploiting both the characteristic features of a recording medium that operates at low bit cost and those of a non-volatile storage medium that are advantageous in terms of quick responsiveness, low power consumption rate and so on.

Still additionally, a composite type recording apparatus according to an embodiment of the present invention has a FAT for managing the data region of the recording medium, which FAT is open to the outside, and a FAT for managing the data region of the non-volatile storage medium, which FAT is to be used only in the inside of the medium, and is adapted to restrict write operations depending on the type of the host apparatus and copy the data written in the data region of the non-volatile storage medium in the data region of the recording medium after the end of the data writing operation so that a general purpose apparatus can neither write data in nor read data from the data region of the non-volatile storage medium. Therefore, after data are written in a composite type recording apparatus according to an embodiment of the present invention by a general purpose apparatus, a dedicated apparatus can write data in the composite type recording apparatus, exploiting both the characteristic features of a recording medium that operates at low bit cost and those of a non-volatile storage medium that are advantageous in terms of quick responsiveness, low power consumption rate and so on.

Still additionally, a data writing method and a data writing program according to an embodiment of the present invention are adapted to write data in a composite type recording apparatus that has a FAT for managing the data region of the recording medium, which FAT is open to the outside, and a FAT for managing the data region of the non-volatile storage medium, which FAT is to be used in the inside of the medium, and is adapted to restrict write operations depending on the type of the host apparatus and copy the data written in the data region of the non-volatile storage medium in the data region of the recording medium after the end of the data writing operation so that a general purpose apparatus can neither write data in nor read data from the data region of the non-volatile storage medium. Thus, a data writing method and a data writing program according to an embodiment of the present invention do not allow any access to the data region of the non-volatile storage medium for the purpose of writing data or reading data so long as a general purpose apparatus is connected to the composite type recording apparatus. Therefore, after data are written in a composite type recording apparatus according to an embodiment of the present invention by a general purpose apparatus, a dedicated apparatus can write data in the composite type recording apparatus, exploiting both the characteristic features of a recording medium that operates at low bit cost and those of a non-volatile storage medium that are advantageous in terms of quick responsiveness, low power consumption rate and so on.

BRIEF DESCRIPTION OF THE DRAWINGS

FIG. 5 is a schematic illustration of the directory region of the composite type recording apparatus of FIG. 1, showing the configuration thereof;

DETAILED DESCRIPTION OF THE PREFERRED EMBODIMENTS

The present invention relates to a composite type recording apparatus having a hard disc drive (HDD) with a disc-shaped recording medium mounted therein and a non-volatile storage medium, which may typically be a FLASH memory and adapted to handle the data region of the HDD and the data region of the non-volatile storage medium as an integrated data region or as a partly integrated data region. In the following description, it is assumed that a MS-DOS compatible FAT file system is adopted as file system.

Figure 1:
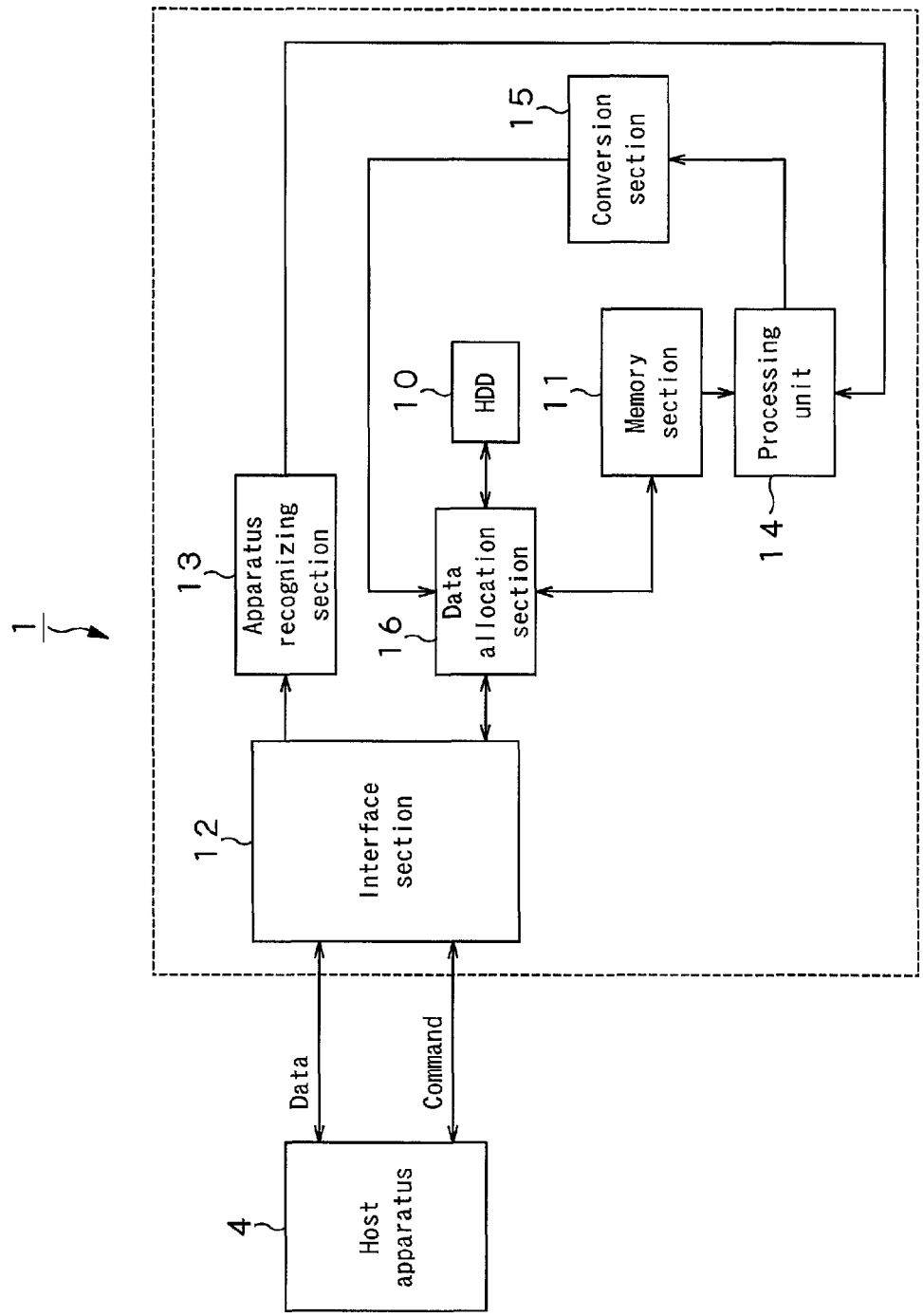
FIG. 1 is a schematic block diagram of a composite type recording apparatus according to an embodiment of the present invention, illustrating the configuration thereof.

As shown in FIG. 1, the composite type recording apparatus 1 according to an embodiment of the present invention includes a HDD 10 having a recording medium 2 including a data region A to which addresses (to be referred to as physical addresses hereinafter) are affixed at least for every data of a predetermined size, a memory section 11 including a non-volatile storage medium 3 having a data region B to which a series of addresses (to be referred to as memory addresses) are affixed to succeed the addresses of the data region A and an identification information table where predetermined identification information is written at every predetermined address (to be referred to as logical address hereinafter), an apparatus recognizing section 13 for recognizing a host apparatus 4, a processing unit 14 for reading out the identification information table from the non-volatile storage medium 3 and selecting a logical address where predetermined identification information is written according to the outcome of recognition of the apparatus recognizing section 13, a conversion section 15 for converting the logical address selected by the processing unit 14 into a physical address corresponding to the data region A or into a memory address corresponding to the data region B according to a predetermined table and a data allocation section 16 for allocating the data supplied from the host apparatus 4 to the HDD 10 or the memory section 11 according to the physical address or the memory address produced by the conversion by the conversion section 15. The composite type recording apparatus 1 is adapted to be connected to a host apparatus 4, which may be a dedicated apparatus or a general purpose apparatus by way of an interface section 12 that conforms to the standard of IDE, that of SCSI, that of FC, that of USB or some other appropriate standard. The data region A and the data region B will be described in greater detail by referring to FIGS. 8, 9 and 12 hereinafter.

A dedicated apparatus as used herein refers to an application apparatus such as a video camera, digital camera or a music player that can efficiently operate for recording and reproducing data, exploiting the advantages of the composite type recording apparatus 1. Such a dedicated apparatus can recognize the recording apparatus 1 connected to it as composite type recording apparatus including a recording medium 2 and a non-volatile storage medium 3 when it is activated typically by issuing an identity device command (ATA Standard) to the composite type recording apparatus 1 and acquiring parameter information relating to the composite type recording apparatus 1. As far as this embodiment is concerned, a dedicated apparatus refers to an apparatus that can recognize the composite type recording apparatus 1 and hence discriminate the HDD 10 and the memory section 11 as will be described in greater detail hereinafter.

On the other hand, a general purpose apparatus as used herein refers to a personal computer or a similar apparatus that is adapted to operate for recording and reproducing data according to the specific file system it includes and is not able to recognize a recording apparatus having a configuration that is not defined in the file system. As far as this embodiment is concerned, a general purpose apparatus refers to an apparatus that is unable to recognize the composite type recording apparatus 1 and hence discriminate HDD 10 and the memory section 11 so that it recognizes the composite type recording apparatus 1 only as a single data region as will be described in greater detail hereinafter.

Figure 2:
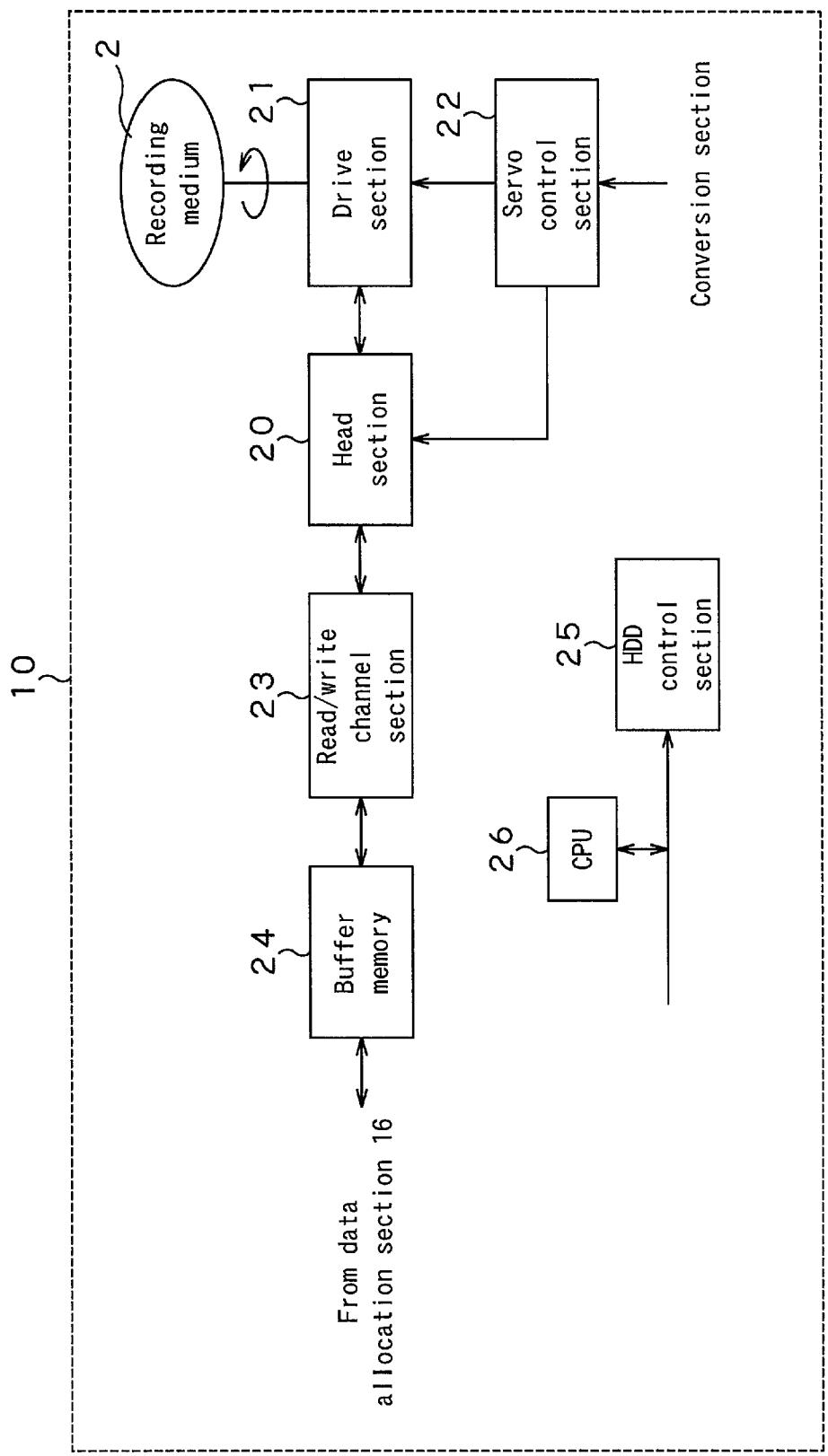
FIG. 2 is a schematic block diagram showing the configuration of the HDD provided in the composite type recording apparatus of FIG. 1.

As shown in FIG. 2, the HDD 10 includes a head section 20 that operates to write data in and read data from the recording medium 2, a drive section 21 for driving the recording medium 2 to rotate in a predetermined direction at a predetermined number of revolutions per unit time, a servo control section 22 for controlling the head section 20 and the drive section 21, a read/write channel section 23 connected to the head section 20 to execute a predetermined process on the data supplied to it, a buffer memory 24 for temporarily buffering data, an HDD control section 25 for controlling the servo control section 22 and the read/write channel section 23, a central processing unit (CPU) 26 adapted to execute predetermined arithmetic operations and select the commands and the parameters necessary for the servo control section 22 and the read/write channel section 23 and a recording medium 2 in which data are written and from which data written there are read out.

The servo control section 22 controls the drive section 21 so as to drive the recording medium 2 to rotate in a predetermined direction at a predetermined number of revolutions per unit time and controls the operation of driving the head section 20 so as to access the predetermined location on the recording medium 2 that corresponds to the physical address supplied from the conversion section 15.

In a data writing operation, the read/write channel section 23 encodes (modulates) the data supplied from the data allocation section 16, converts them into a sequence of digital bits suited to the characteristic features of the recording/reproduction system and subsequently supplies the data obtained as a result of the conversion to the head section. In a data reading operation, the read/write channel section 23 removes high frequency noises from the reproduction signal supplied from the head section 20, digitizes the reproduction signal by means of an analog/digital converter (ADC), executes a predetermined process typically by means of a maximum likelihood decoding method or the like and subsequently demodulates the signal.

In a data writing operation, the buffer memory 24 temporarily buffers the data supplied to it from the host apparatus 4 by way of the data allocation section 16 under the control of the HDD control section 25. When the data gets to a predetermined volume level, data are read out from the buffer memory 24 and the read out data are supplied to the read/write channel section 23. In a data reading operation, the buffer memory 24 also temporarily buffers the data supplied to it from the read/write channel section 23 under the control of the HDD control section 25. When the data gets to a predetermined volume level, data are read out from the buffer memory 24 and the read out data are supplied to the host apparatus 4 by way of the data allocation section 16 and the interface section 12. The buffer memory 24 is also used to temporarily buffer data and suppress a fall of performance due to the difference of data transfer rate both in a data writing operation and in a data reading operation.

The HDD control section 25 manages data transmissions and data receptions between the buffer memory 24 and the read/write channel section 23 and between the buffer memory 24 and the data allocation section 16 by means of a FAT file system, which will be described in greater detail hereinafter, and executes processes relating to the data format. Additionally, the HDD control section 25 also executes processes relating to correction coding, error detections and error corrections, using error correction codes when it executes the above processes.

The recording medium 2 is a disc-shaped recording medium and has a data region A that is managed by a FAT file system and to which physical addresses are affixed for every data of a predetermined size by means of a format.

Figures 3, 4:
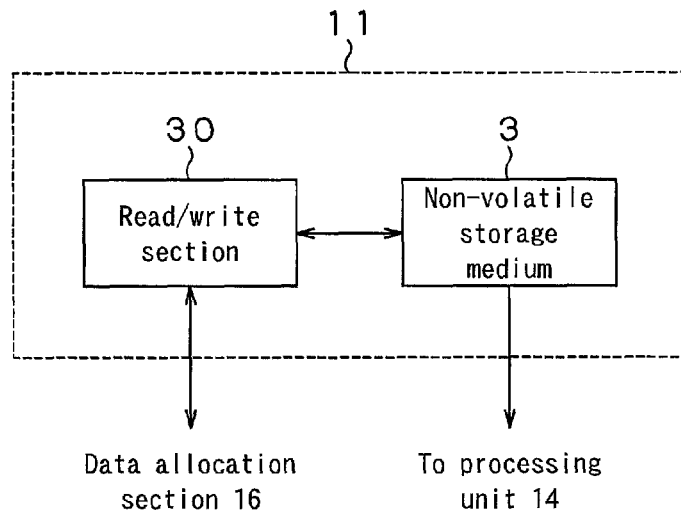
FIG. 3 is a schematic block diagram of the memory section of the composite type recording apparatus of FIG. 1.
FIG. 4 is a schematic illustration of pieces of identification information, showing the meanings thereof.

As shown in FIG. 3, the memory section 11 has a read/write section 30 for writing the data supplied from the data allocation section 16 in the non-volatile storage medium 3 based on the memory address converted by the conversion section 15 and reading data from the non-volatile storage medium 3 and a non-volatile storage medium 3.

The non-volatile storage medium 3 is typically a NAND-type FLASH memory card (memory stick, compact flash, SD card or the like) that adopts a FAT file system and includes a data region B to which a series of addresses (memory addresses) are affixed to succeed the addresses of the data region A for every data of a predetermined size and an identification information table where predetermined identification information is written for each memory address.

According to an embodiment of the present invention, the data region A of the recording medium 2 and the data region B of the non-volatile storage medium 3 are integrated by a FAT (file allocation table) file system and managed as integrated data region or as partly integrated data region.

Now, a FAT file system will be described below. A FAT is a table that shows how files are stored in clusters and a FAT file system is a format system that manages the host apparatus 4 by means of the table. Formatting is an operation of adjusting sub-regions of a predetermined size in a data storage region and affixing numbers (physical addresses) to the adjusted sub-regions. Formatting is completed by so-called physical formatting by which the track formed in the recording medium 2 is divided into sectors and so-called logical formatting by which a plurality of sectors are put together to form a unit of cluster and produce a system region C, a disc region and a data region.

A sector is the smallest unit for recording data in the recording medium 2 (normally of 512 bytes), which is also adopted as the smallest unit in the present invention. The host apparatus 4 accesses the recording medium 2 by means of a logical block address (LBA). A plurality of (N) sectors are put together to form a cluster, which is used as the smallest unit for reading and writing data in the FAT file system that manages files.

The system region C that is produced by formatting includes a master boot record and a FAT region where a FAT is written. The master boot record is a sector with LBA "0" as viewed from the host apparatus 4 and a boot strap record is recorded there with a partition table.

As shown in FIG. 4, predetermined information such as empty information of the data region is shown on a FAT by means of pieces of identification information. For example, piece of identification information "0000h" signifies that the corresponding cluster is "empty" and pieces of identification information "0002h through FFF6h" signify that the corresponding clusters are "allocated out" and the corresponding values are the cluster numbers that are continued, whereas piece of identification information "FFF7h" signifies that the corresponding cluster is a "defective cluster" and pieces of identification information "FFF8h through FFFFh" signify end of file (EOF), indicating that the corresponding clusters are "allocated out.

The data region includes a directory region to be used for managing file information and a data region where data are actually written. As shown in FIG. 5, the directory region contains information such as the file name, the extension, the attributes, the clock time of the latest updating, the starting cluster address and the file size of each directory (file).

According to the embodiment of the present invention, the system region C that is read first when power is supplied to the composite type recording apparatus 1 is arranged not in the HDD 10 in which a predetermined time period is necessary before the data in it become accessible but in the non-volatile storage medium 3 that allows accesses to the data stored in it at any time.

Therefore, the recording medium 2 of the HDD 10 includes a data region A to which a physical address is affixed for every data of a predetermined size, whereas the non-volatile storage medium 3 of the memory section 11 includes a data region B to which a memory address is affixed for every data of a predetermined size and a system region C containing a FAT that is formed by logical addresses, which logical addresses are associated with physical addresses of the data region A and the memory addresses of the data region B.

Thus, it is possible to read the system region C immediately after a host apparatus 4 is connected to the composite type recording apparatus 1 and power is supplied to the recording apparatus 1.

The apparatus recognizing section 13 recognizes that the host apparatus 4 connected to the interface section 12 is a dedicated apparatus that can discriminate the HDD 10 and the memory section 11 and not a general purpose apparatus or vice versa. The apparatus recognizing section 13 supplies a recognition result to the processing unit 14.

The processing unit 14 has a CPU for various processing operations and a RAM for temporarily storing data and operates to read out the FAT from the system region C contained in the non-volatile storage medium 3, move the selection pointer of the FAT it reads out according to the outcome of recognition as supplied from the apparatus recognizing section 13 and selects the logical address at which predetermined identification information is written. The processing unit 14 supplies the selected logical address to the conversion section 15.

The conversion section 15 has an address conversion table to be used for converting the logical address supplied from the processing unit 14 into a physical address or a memory address. If the address produced as a result of the conversion is a physical address, the conversion section 15 supplies the physical address to the HDD 10. If, on the other hand, the address produced as a result of the conversion is a memory address, the conversion section 15 supplies the memory address to the memory section 11. Additionally, the conversion section 15 supplies the outcome of conversion to the data allocation section 16.

The data allocation section 16 allocates the data supplied form the host apparatus 4 by way of the interface section 12 either to the HDD 10 or to the memory section 11 based on the outcome of conversion supplied from the conversion section 15. For example, if information telling that a logical address is converted into a physical address is supplied from the conversion section 15, the data allocation section 16 allocates the data supplied from the host apparatus 4 by way of the interface section 12 to the HDD 10. If, on the other hand, information telling that a logical address is converted into a memory address is supplied from the conversion section 15, the data allocation section 16 allocates the data supplied from the host apparatus 4 by way of the interface section 12 to the memory section 11.

Now, the operation of the first embodiment of the invention will be described by referring to the flowcharts of FIGS. 6 and 7. In the first embodiment, the composite type recording apparatus 1 includes a recording medium 2 having a data region A to which physical addresses 0002h through 7FFFh are affixed and a non-volatile storage medium 3 having a data region B to which memory addresses 8000h through 8FFFh are affixed and a system region C containing a predetermined FAT.

Since the FAT handles the data region A and the data region B integrally or partly integrally, 0000h through 7FFFh are affixed to it as logical addresses corresponding to the data region A and 8000h through 8FFFh are affixed to it as logical addresses corresponding the data region B. Therefore, when a data write operation is conducted according to the FAT, data are written to the data region B only when the data region A is all "allocated out".

If the capacity of a sector that is formed by formatting is 512 Bytes and 1 cluster is constituted by 64 sectors, the capacity of a cluster is $$64 \times 512 B \approx 32 \ KB$$

and hence the data capacity of the data region B of the recording medium 2 is $$32 \ KB \times 32{,}767 \approx 1 \ GB.$$

The capacity of the data region B of the non-volatile storage medium 3 corresponds to 4,096 clusters and hence is $$32 \ KB \times 4{,}096 \approx 128 \ MB.$$

Figure 8:
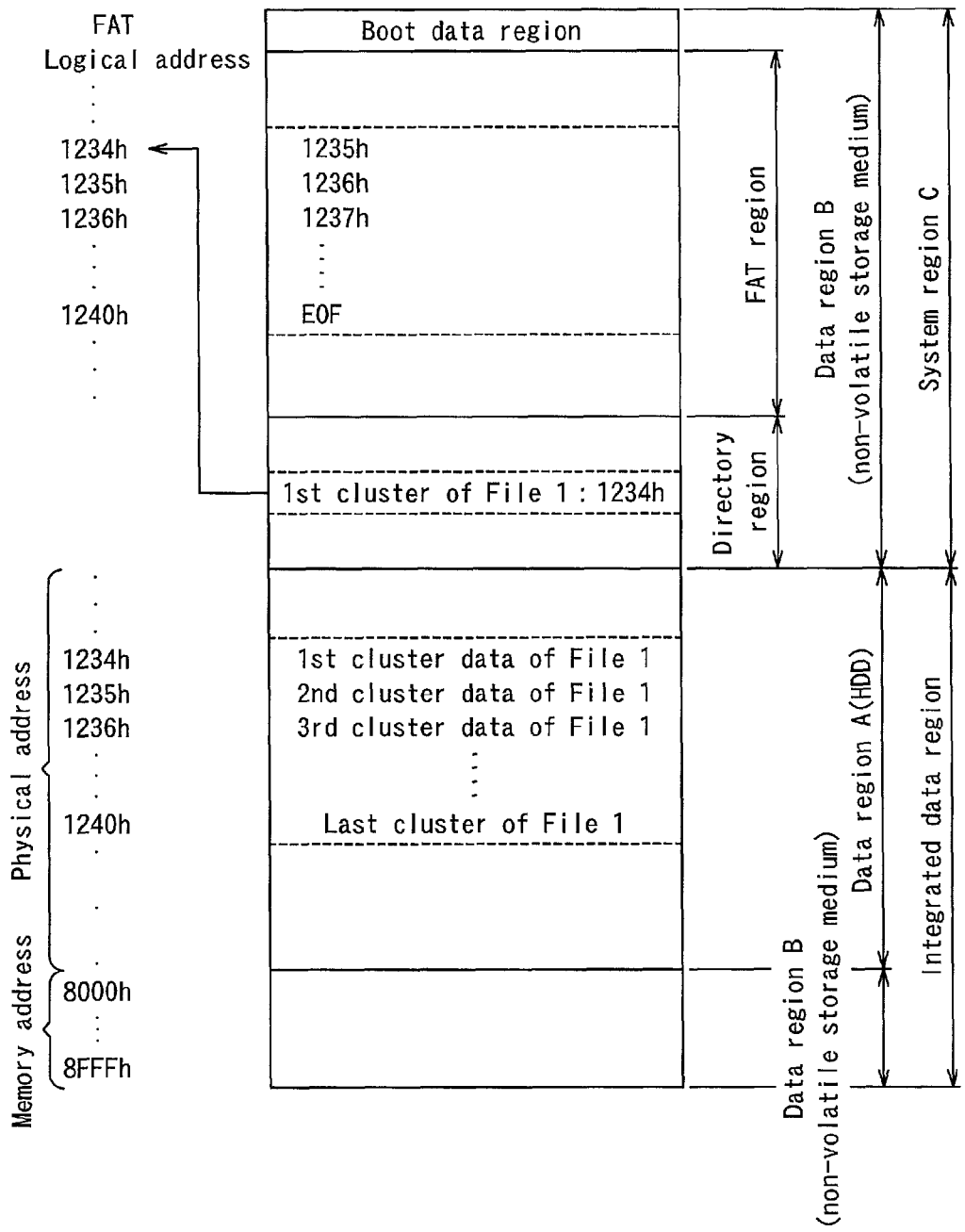
FIG. 8 is a schematic illustration of a first configuration of data region A and data region B.

FIG. 8 illustrates that the file (File 1) supplied from the host apparatus 4 is divided into clusters and written in the data region A. When reading such a file, the file name is retrieved from the data written in the directory region, the data corresponding to the File 1 is read out and the logical address that indicates the top of the first cluster is extracted from the read out data. Then, the data of the File 1 are read out sequentially from the data region B on the basis of the logical address by referring to the FAT.

When a host apparatus 4 is connected to the interface section 12, the composite type recording apparatus 1 recognizes that the host apparatus 4 is a dedicated apparatus and not a general purpose apparatus or vice versa by means of the apparatus recognizing section 13 and controls the operation of writing data by means of the processing unit 14 according to the outcome of recognition. The composite type recording apparatus 1 executes a data writing process according to the flowchart of FIG. 6 when a dedicated apparatus is connected to the interface section 12, whereas it executes a data writing process according to the flowchart of FIG. 7 when a general purpose apparatus is connected to the interface section 12.

Now, a data writing process that the composite type recording apparatus 1 executes when a dedicated apparatus is connected to the interface section 12 will be described below.

Figure 6:
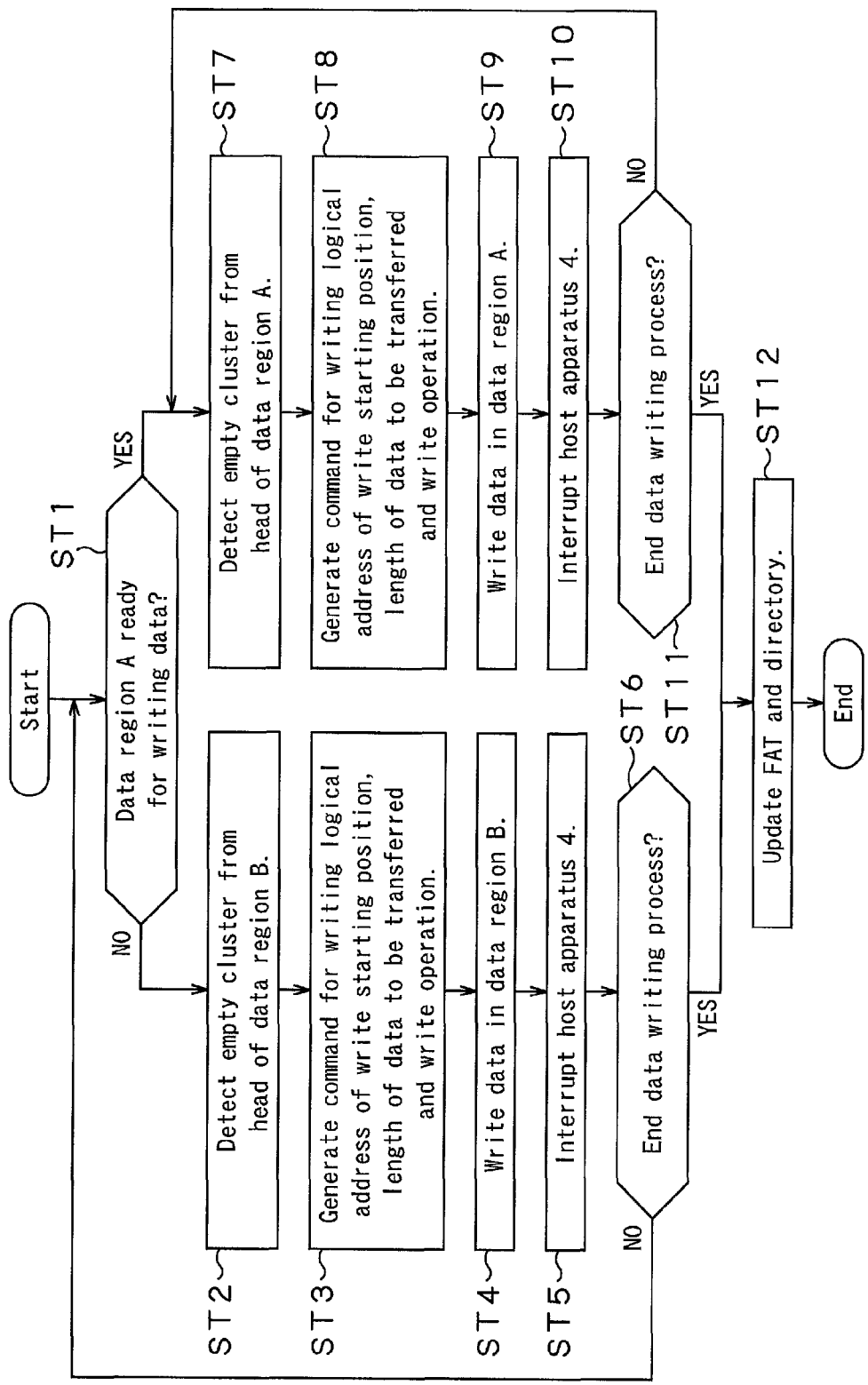
FIG. 6 is a first flowchart of the operation of writing the data supplied from a host apparatus in the composite type recording apparatus of FIG. 1.

Referring to FIG. 6, the composite type recording apparatus 1 determines if the data region A is ready for a data writing operation or not in Step ST1. The operation proceeds to Step ST2 when the data region A is not ready for a data writing operation, whereas it proceeds to Step ST7 when the data region A is ready for a data writing operation.

As pointed out above, several seconds are necessary for the recording medium 2 from the time when it is driven to rotate by the drive section 21 under the control of the servo control section 22 to the time when it rotates at a predetermined number of revolutions per unit time and becomes ready for a data writing operation. Therefore, the composite type recording apparatus 1 controls the data allocation section 16 so as to write the data supplied from the dedicated apparatus in the data region B of the non-volatile storage medium 2 until the data region A becomes ready for a data writing operation and, when the data region A becomes ready for a data writing operation, it controls the data allocation section 16 so as to write the data supplied from the dedicated apparatus in the data region A of the recording medium 2.

In Step ST2, the composite type recording apparatus 1 detects an empty cluster from the head of the data region B. The processing unit 14 reads out the FAT from the data region B and develops the FAT it reads out in the RAM. The processing unit 14 recognizes that the host apparatus 4 is a dedicated apparatus according to the outcome of recognition supplied from the apparatus recognizing section 13 and moves the selection pointer to the position of logical address 8000h of the FAT developed in the RAM. Then, it starts retrieving identification information indicating an empty region from logical address 8000h toward logical address 8FFFh by means of the selection pointer.

In Step ST3, the processing unit 14 supplies the logical address in the detected empty region at which a write operation is to be started and the length of the data to be transferred and a command that instructs to the conversion section 15. The processing unit 14 also generates a command ordering a write operation and supplies it to the conversion section 15.

In Step ST4, the composite type recording apparatus 1 writes the data in the data region that corresponds to the predetermined memory address of the data region B. The conversion section 15 converts the logical address supplied from the processing unit 14 into a memory address according to the address conversion table and supplies the memory address produced as a result of the conversion to the memory section 11. Additionally, the conversion section 15 notifies the data allocation section 16 that the logical address supplied from the processing unit 14 is converted into a memory address.

The data allocation section 16 allocates the data supplied by way of the interface section 12 to the memory section 11 in response to the notification from the conversion section 15. Then, the memory section 11 executes a process of writing the data supplied from the data allocation section 16 in the data region B by the amount corresponding to the data transfer length according to the memory address supplied from the conversion section 15.

In Step ST5, the composite type recording apparatus 1 interrupts the host apparatus 4. That is, the composite type recording apparatus 1 interrupts the host apparatus 4 after writing the data in the data region B by the amount corresponding to the data transfer length.

In Step ST6, the composite type recording apparatus 1 determines if it ends the data writing process or not. The composite type recording apparatus 1 proceeds to Step ST12 when it ends the data writing process but it returns to Step ST1 when it continues the data writing process. If the composite type recording apparatus 1 returns to Step ST1 and the data region A is not ready for a data writing operation, the composite type recording apparatus 1 repeats Step ST2 through Step ST5.

In Step ST7, the composite type recording apparatus 1 detects an empty cluster from the head of the data region A. The processing unit 14 moves the selection pointer to the position of logical address 0002h of the FAT developed in the RAM. Then, it starts retrieving identification information indicating an empty region from logical address 0002h toward logical address 8FFFh by means of the selection pointer.

Alternatively, the processing unit 14 may proceed to Step ST7 when it receives information from a monitor section (not shown) monitoring the activated state of the recording medium 2 telling that the data region A is ready for a data writing operation.

In Step ST8, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST9, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST10, the composite type recording apparatus 1 interrupts the host apparatus 4. That is, the composite type recording apparatus 1 interrupts the host apparatus 4 after writing the data in the data region B by the amount corresponding to the data transfer length.

In Step ST11, the composite type recording apparatus 1 determines if it ends the data writing process or not. The composite type recording apparatus 1 proceeds to Step ST12 when it ends the data writing process but it returns to Step ST7 and repeats Step ST8 through Step ST11 when it continues the data writing process.

In Step ST12, the composite type recording apparatus 1 updates the FAT and the directory in response to the new data written in the data region B in Step ST2 through Step ST4 and the new data written in the data region A in Step ST7 through Step ST9.

Additionally, since the data that are written in the composite type recording apparatus 1 are read out sequentially in the order in which they are written, the composite type recording apparatus 1 is not able to read the data until the recording medium 2 is activated in a data reading operation if the leading data of each file is written in the data region A. Therefore, it may alternatively be so arranged that the composite type recording apparatus 1 automatically writes the data supplied from a dedicated apparatus in the data region B by the amount that corresponds to a predetermined time period, which is the time period necessary for the recording medium 2 to be activated, in a data writing operation regardless if the data region A is ready for a data writing operation or not. With this arrangement, data can be reproduced instantaneously without any waiting time because the composite type recording apparatus 1 reads out the leading data of each file from the data region B and activates the recording medium 2 while it is reading out the leading data so that it can read out the data linked to the leading data from the data region A after the recording medium 2 is activated.

Now, a data writing process that the composite type recording apparatus 1 executes when a general purpose apparatus is connected to the interface section 12 will be described below by referring to the flowchart of FIG. 7.

Figure 7:
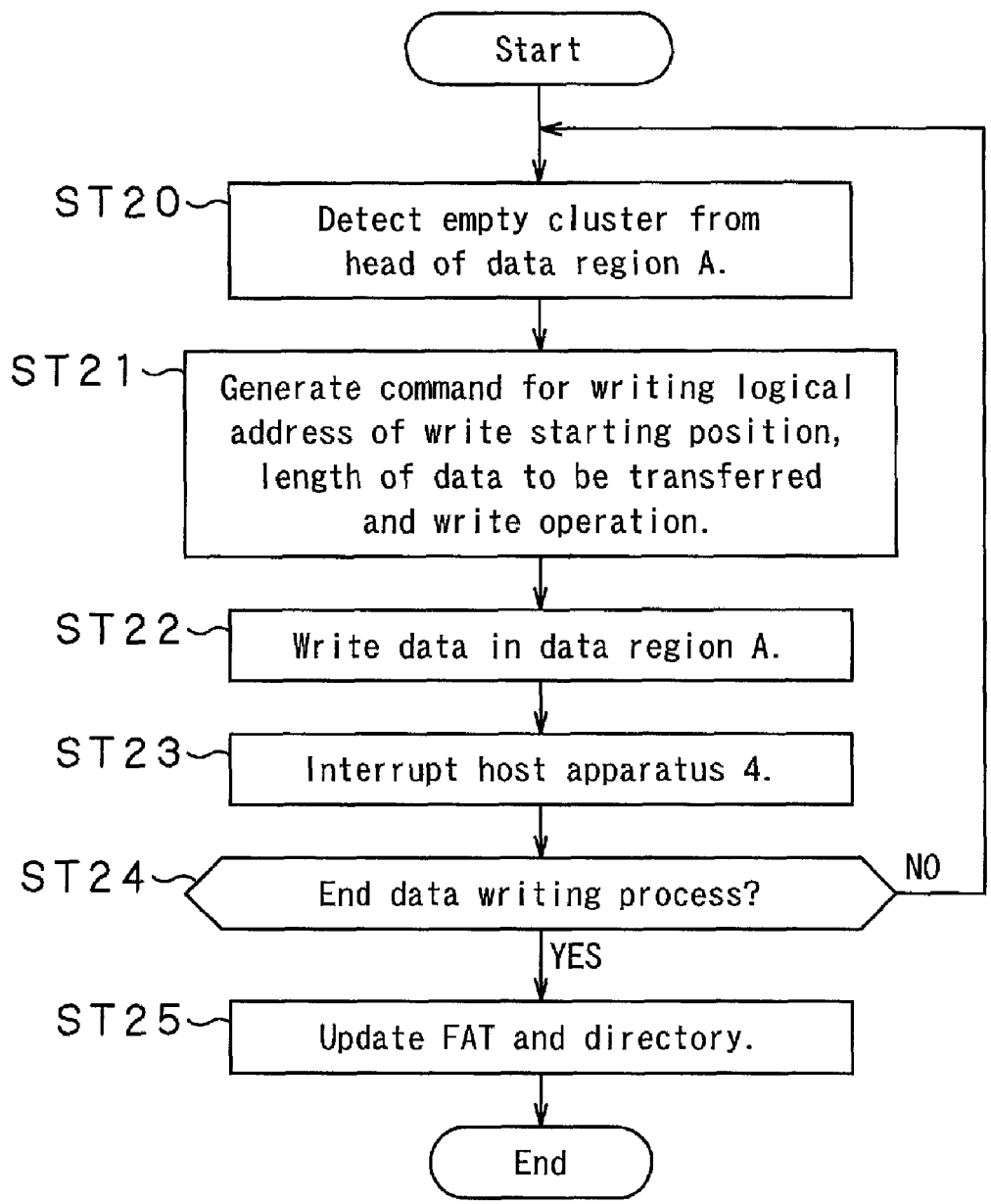
FIG. 7 is a second flowchart of the operation of writing the data supplied from a host apparatus in the composite type recording apparatus of FIG. 1.

Referring to FIG. 7, the composite type recording apparatus 1 detects an empty cluster from the head of the data region A in Step ST20. More specifically, the composite type recording apparatus 1 waits until the data region A becomes ready for a data writing operation and then detects an empty cluster from the head of the data region A.

The processing unit 14 reads out the FAT from the data region B and develops the FAT it reads out in the RAM. Then, the processing unit 14 moves the selection pointer to the position of logical address 0002h of the FAT developed in the RAM and starts retrieving identification information indicating an empty region from logical address 0002h toward logical address 8FFFh by means of the selection pointer.

In Step ST21, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST22, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST23, the composite type recording apparatus 1 interrupts the host apparatus 4. That is, the composite type recording apparatus 1 interrupts the host apparatus 4 after writing the data in the data region A by the amount corresponding to the data transfer length.

In Step ST24, the composite type recording apparatus 1 determines if it ends the data writing process or not. The composite type recording apparatus 1 proceeds to Step ST25 when it ends the data writing process but it returns to Step S20 and repeats Step ST20 through Step ST24 when it continues the data writing process.

In Step ST25, the composite type recording apparatus 1 updates the FAT and the directory in response to the new data written in the data region A.

The steps from Step ST1 to Step ST12 and the steps from Step ST20 to Step ST25 may be programmed so that the composite type recording apparatus 1 may execute data writing operations by causing a computer to execute the program.

Thus, since the data region B of the non-volatile storage medium 3 is allocated after the data region A as described above, a dedicated apparatus is unable to write data in the data region B until all the region of the data region A is "allocated out".

In this way, the composite type recording apparatus 1 according to the embodiment of the invention restricts write operations depending on the type of the host apparatus 4 so that if the host apparatus is a general purpose apparatus and writing data, no data is written in the data region A until all the region of the data region B is "allocated out". Therefore, after data are written in the composite type recording apparatus 1 by a general purpose apparatus, a dedicated apparatus can write data in the composite type recording apparatus, exploiting both the characteristic features of a recording medium 2 that operates at low bit cost and those of a non-volatile storage medium 3 that are advantageous in terms of quick responsiveness, low power consumption rate and so on.

Additionally, the composite type recording apparatus 1 according to the embodiment of the present invention can read data by trailing the link information on the FAT contained in the data region B in a data reproducing operation if the host apparatus 4 connected to the interface section 12 is a general purpose apparatus. Thus, the data written by a dedicated apparatus can be read out by a general purpose apparatus and vice versa.

Now, the second embodiment of the present invention will be described below. The second embodiment is adapted to prohibit writing data in the data region B in a data writing operation when the host apparatus 4 is a general purpose apparatus but allow data to be written in the data region B normally in a data writing operation when the host apparatus 4 is a dedicated apparatus.

The composite type recording apparatus 1 of the second embodiment includes a recording medium 2 having a data region A to which physical addresses 0000h through 7FFFh are affixed and a non-volatile storage medium 3 having a data region B to which memory addresses 8000h through 8FFFh are affixed and a system region C that includes a first FAT and a second FAT.

Figure 9:
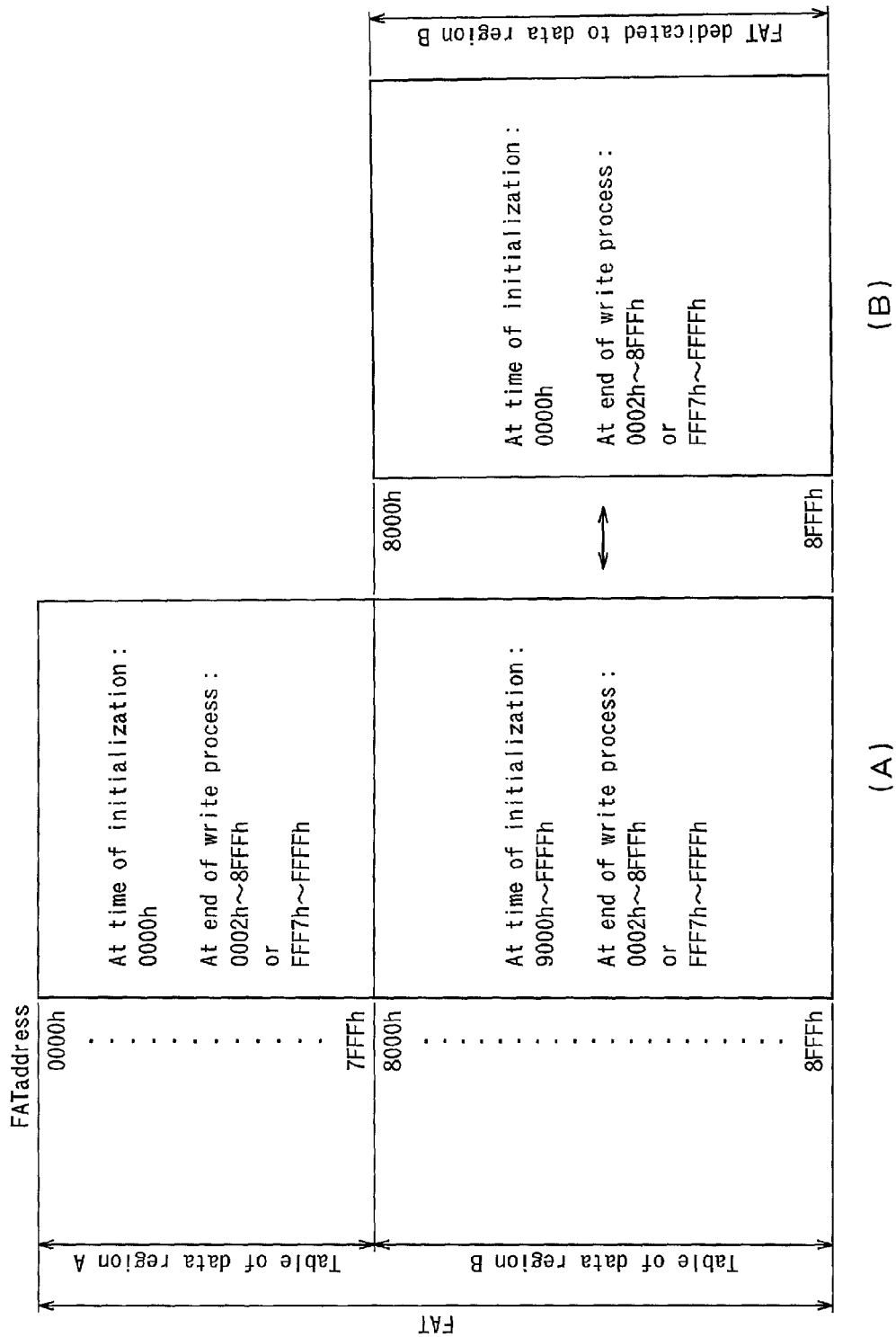
FIG. 9 is a schematic illustration of a second configuration of data region A and data region B.

At the time of initialization or at the time of shipment from the manufacturing plant, the first FAT is made to carry addresses (logical addresses) 0000h through 7FFFh affixed thereto that correspond to the addresses of the data region A and addresses (logical addresses) 8000h through 8FFFh affixed thereto that correspond to the addresses of the data region B as indicated by A in FIG. 9. Additionally, pieces of identification information such as identification information telling that writing data at logical addresses 8000h through 8FFFh is prohibited, identification information telling, for example, that data are written there, identification information indicating out of data region (9000h through FFFFh), identification information indicating EOF (FFF8h through FFFFh) or identification information indicating a defective cluster (FFF7h) is written there.

Similarly, at the time of initialization or at the time of shipment from the manufacturing plant, the second FAT is made to carry addresses 8000h through 8FFFh affixed thereto that correspond to the addresses of the data region B as indicated by B in FIG. 9.

Now, a data writing process that the composite type recording apparatus 1 executes when a dedicated apparatus is connected to the interface section 12 will be described below by referring to the flowchart of FIG. 10.

Figure 10:
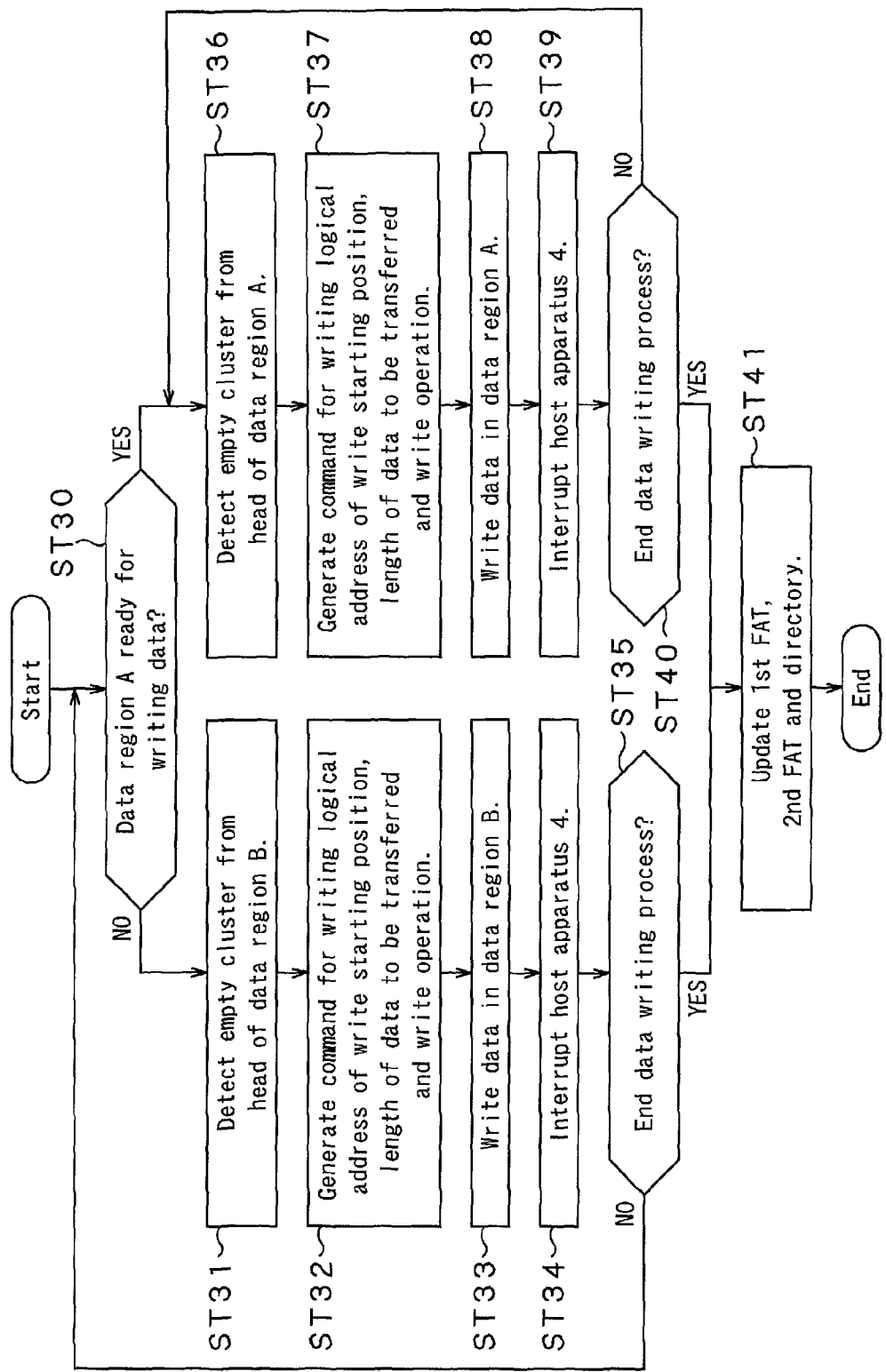
FIG. 10 is a third flowchart of the operation of writing the data supplied from a host apparatus in the composite type recording apparatus of FIG. 1.

Referring to FIG. 10, the composite type recording apparatus 1 determines if the data region A is ready for a data writing operation or not in Step ST30. The operation proceeds to Step ST31 when the data region A is not ready for a data writing operation, whereas it proceeds to Step ST36 when the data region A is ready for a data writing operation.

As pointed out above, several seconds are necessary for the recording medium 2 from the time when it is driven to rotate by the drive section 21 under the control of the servo control section 22 to the time when it rotates at a predetermined number of revolutions per unit time and becomes ready for a data writing operation. Therefore, the composite type recording apparatus 1 controls the data allocation section 16 so as to write the data supplied from the dedicated apparatus in the data region B of the non-volatile storage medium 3 until the data region A becomes ready for a data writing operation and, when the data region A becomes ready for a data writing operation, it controls the data allocation section 16 so as to write the data supplied from the dedicated apparatus in the data region A of the recording medium 2.

In Step ST31, the composite type recording apparatus 1 detects an empty cluster from the head of the data region B. The processing unit 14 reads out the first FAT and the second FAT from the data region B and develops the first FAT and the second FAT it reads out in the RAM. The processing unit 14 recognizes that the host apparatus 4 is a dedicated apparatus according to the outcome of recognition supplied from the apparatus recognizing section 13 and moves the selection pointer to the position of logical address 8000h of the second FAT developed in the RAM. Then, it starts retrieving identification information indicating an empty region from logical address 8000h toward logical address 8FFFh by means of the selection pointer.

In Step ST32, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST33, the composite type recording apparatus 1 writes the data in the data region that corresponds to the predetermined memory address of the data region B. The conversion section 15 converts the logical address supplied from the processing unit 14 into a memory address according to the address conversion table and supplies the memory address produced as a result of the conversion to the memory section 11. Additionally, the conversion section 15 notifies the data allocation section 16 that the logical address supplied from the processing unit 14 is converted into a memory address.

The data allocation section 16 allocates the data supplied by way of the interface section 12 to the memory section 11 in response to the notification from the conversion section 15. Then, the memory section 11 executes a process of writing the data supplied from the data allocation section 16 in the data region B by the amount corresponding to the data transfer length according to the memory address supplied from the conversion section 15.

In Step ST34, the composite type recording apparatus 1 interrupts the host apparatus 4. That is, the composite type recording apparatus 1 interrupts the host apparatus 4 after writing the data in the data region B by the amount corresponding to the data transfer length.

In Step ST35, the composite type recording apparatus 1 determines if it ends the data writing process or not. The composite type recording apparatus 1 proceeds to Step ST41 when it ends the data writing process but it returns to Step S30 when it continues the data writing process. If the composite type recording apparatus 1 returns to Step ST30 and the data region A is not ready for a data writing operation, the composite type recording apparatus 1 repeats Step S31 through Step ST34.

In Step ST36, the composite type recording apparatus 1 detects an empty cluster from the head of the data region A. The processing unit 14 moves the selection pointer to the position of logical address 0002h of the first FAT developed in the RAM. Then, it starts retrieving identification information indicating an empty region from logical address 0002h toward logical address 8FFFh by means of the selection pointer.

Alternatively, the processing unit 14 may proceed to Step ST36 when it receives information from a monitor section (not shown) monitoring the activated state of the recording medium 2 telling that the data region A is ready for a data writing operation.

In Step ST37, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST38, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST39, the composite type recording apparatus 1 interrupts the host apparatus 4. That is, the composite type recording apparatus 1 interrupts the host apparatus 4 after writing the data in the data region B by the amount corresponding to the data transfer length.

In Step ST40, the composite type recording apparatus 1 determines if it ends the data writing process or not. The composite type recording apparatus 1 proceeds to Step ST41 when it ends the data writing process but it returns to Step S36 and repeats Step ST37 through Step ST40 when it continues the data writing process.

In Step ST41, the composite type recording apparatus 1 updates the first FAT, the second FAT and the directory in response to the new data written in the data region A in Step ST31 through Step ST33 and the new data written in the data region B in Step ST36 through Step ST38.

When updating the first FAT, the identification information that prohibits writing data written in the logical address corresponding to the data region B at the time of initialization or at the time of shipment from the manufacturing plant is updated to identification information identical to the identification information newly written in the logical address of the second FAT.

Additionally, since the data that are written in the composite type recording apparatus 1 are read out sequentially in the order in which they are written, the composite type recording apparatus 1 is unable to read the data until the recording medium 2 is activated in a data reading operation if the leading data of each file is written in the data region A. Therefore, it may alternatively be so arranged that the composite type recording apparatus 1 automatically writes the data supplied from a dedicated apparatus in the data region B by the amount that corresponds to a predetermined time period, which is the time period necessary for the recording medium 2 to be activated, in a data writing operation regardless if the data region A is ready for a data writing operation or not. With this arrangement, data can be reproduced instantaneously without any waiting time because the composite type recording apparatus 1 reads out the leading data of each file from the data region B and activates the recording medium 2 while it is reading out the leading data so that it can read out the data linked to the leading data from the data region A after the recording medium 2 is activated.

Now, a data writing process that the composite type recording apparatus 1 executes when a general purpose apparatus is connected to the interface section 12 will be described below by referring to the flowchart of FIG. 11.

Figure 11:
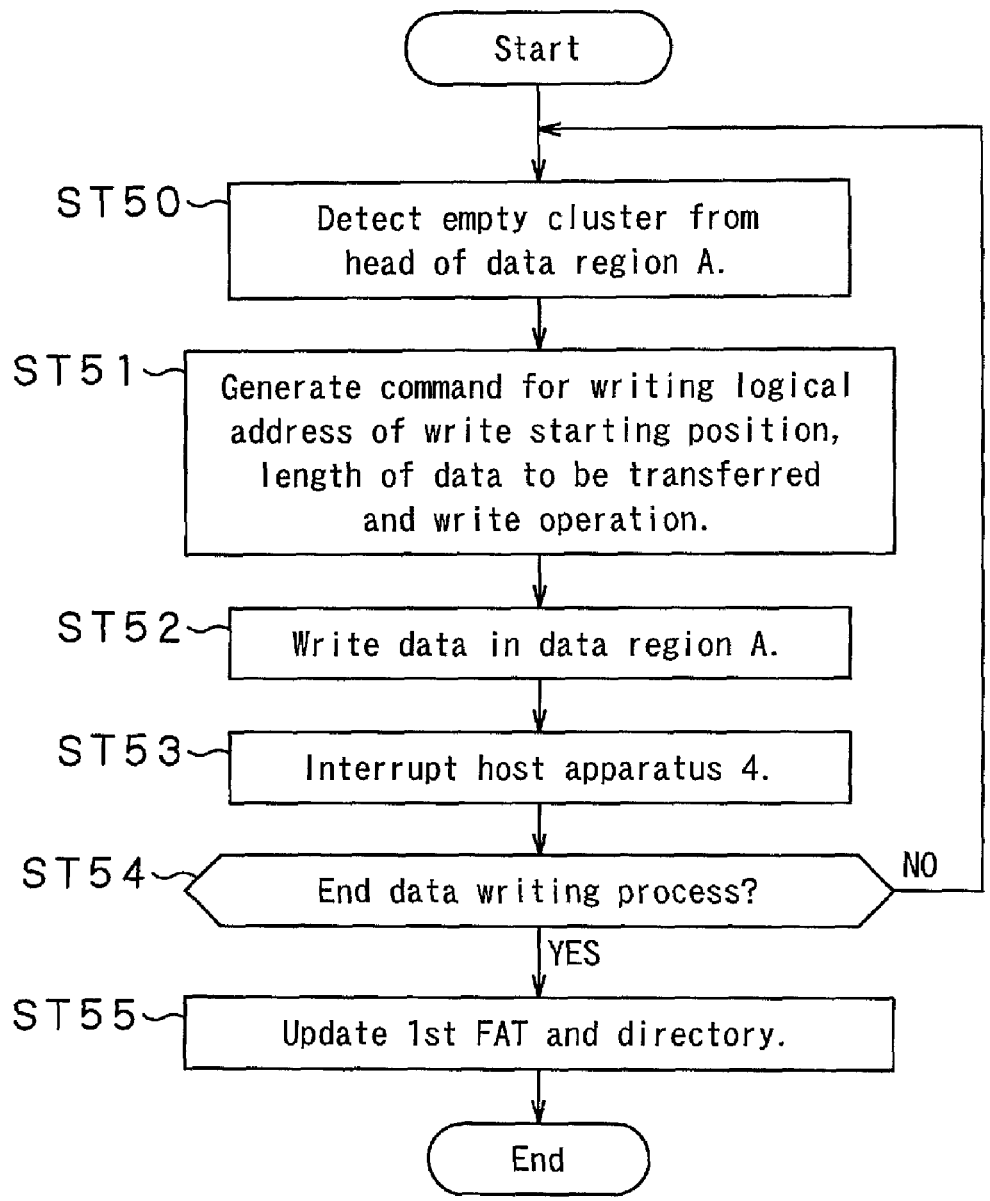
FIG. 11 is a fourth flowchart of the operation of writing the data supplied from a host apparatus in the composite type recording apparatus of FIG. 1.

Referring to FIG. 11, the composite type recording apparatus 1 detects an empty cluster from the head of the data region A in Step ST50. More specifically, the composite type recording apparatus 1 waits until the data region A becomes ready for a data writing operation and then detects an empty cluster from the head of the data region A.

The processing unit 14 reads out the first FAT from the data region B and develops the first FAT it reads out in the RAM. Then, the processing unit 14 moves the selection pointer to the position of logical address 0002h of the first FAT developed in the RAM and starts retrieving identification information indicating an empty region from logical address 0002h toward logical address 8FFFh by means of the selection pointer. Not that since identification information telling that writing data at logical addresses 8000h through 8FFFh is prohibited is written, the processing unit 14 is not able to write any new data when identification information is written at logical addresses 0000h through 7FFFh, telling that data are "already written".

In Step ST51, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST52, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST53, the composite type recording apparatus 1 interrupts the host apparatus 4. That is, the composite type recording apparatus 1 interrupts the host apparatus 4 after writing the data in the data region A by the amount corresponding to the data transfer length.

In Step ST54, the composite type recording apparatus 1 determines if it ends the data writing process or not. The composite type recording apparatus 1 proceeds to Step ST55 when it ends the data writing process but it returns to Step S50 and repeats Step ST50 through Step ST54 when it continues the data writing process.

In Step ST55, the composite type recording apparatus 1 updates the first FAT and the directory in response to the new data written in the data region A.

The steps from Step ST30 to Step ST41 and the steps from Step ST50 to Step ST55 may be programmed so that the composite type recording apparatus 1 may execute data writing operations by causing a computer to execute the program.

In this way, the composite type recording apparatus 1 according to the embodiment of the invention restricts write operations depending on the type of the host apparatus 4 so that if the host apparatus is a general purpose apparatus and writing data, no data is written in the data region B because writing data is prohibited in all the data region B. Therefore, after data are written in the composite type recording apparatus 1 according to the embodiment of the invention by a general purpose apparatus, a dedicated apparatus can write data in the composite type recording apparatus, exploiting both the characteristic features of a recording medium 2 that operates at low bit cost and those of a non-volatile storage medium 3 that are advantageous in terms of quick responsiveness, low power consumption rate and so on.

Additionally, the composite type recording apparatus 1 according to the embodiment of the present invention can read data by trailing the link information on the first FAT contained in the data region B in a data reproducing operation if the host apparatus 4 connected to the interface section 12 is a general purpose apparatus. Thus, the data written by a dedicated apparatus can be read out by a general purpose apparatus and vice versa.

Now, the third embodiment of the present invention will be described below.

The third embodiment is adapted to prohibit writing data in the data region B in a data writing operation when the host apparatus 4 is a general purpose apparatus but allow data to be written in the data region B normally in a data writing operation when the host apparatus 4 is a dedicated apparatus. In the third embodiment, the data region B is used to temporarily hold the data supplied from a dedicated apparatus.

The composite type recording apparatus 1 of the third embodiment includes a recording medium 2 having a data region A to which predetermined physical addresses are affixed and a non-volatile storage medium 3 having a data region B to which predetermined memory addresses are affixed and a system region C that includes a third FAT and a fourth FAT.

Predetermined logical addresses that correspond to the data region A are affixed to the third FAT as shown in FIG. 12A, whereas predetermined logical addresses that correspond to the data region B are affixed to the fourth FAT as shown in FIG. 12B.

Now, a data writing process that the composite type recording apparatus 1 executes when a dedicated apparatus is connected to the interface section 12 will be described below by referring to the flowchart of FIG. 13.

Figure 13:
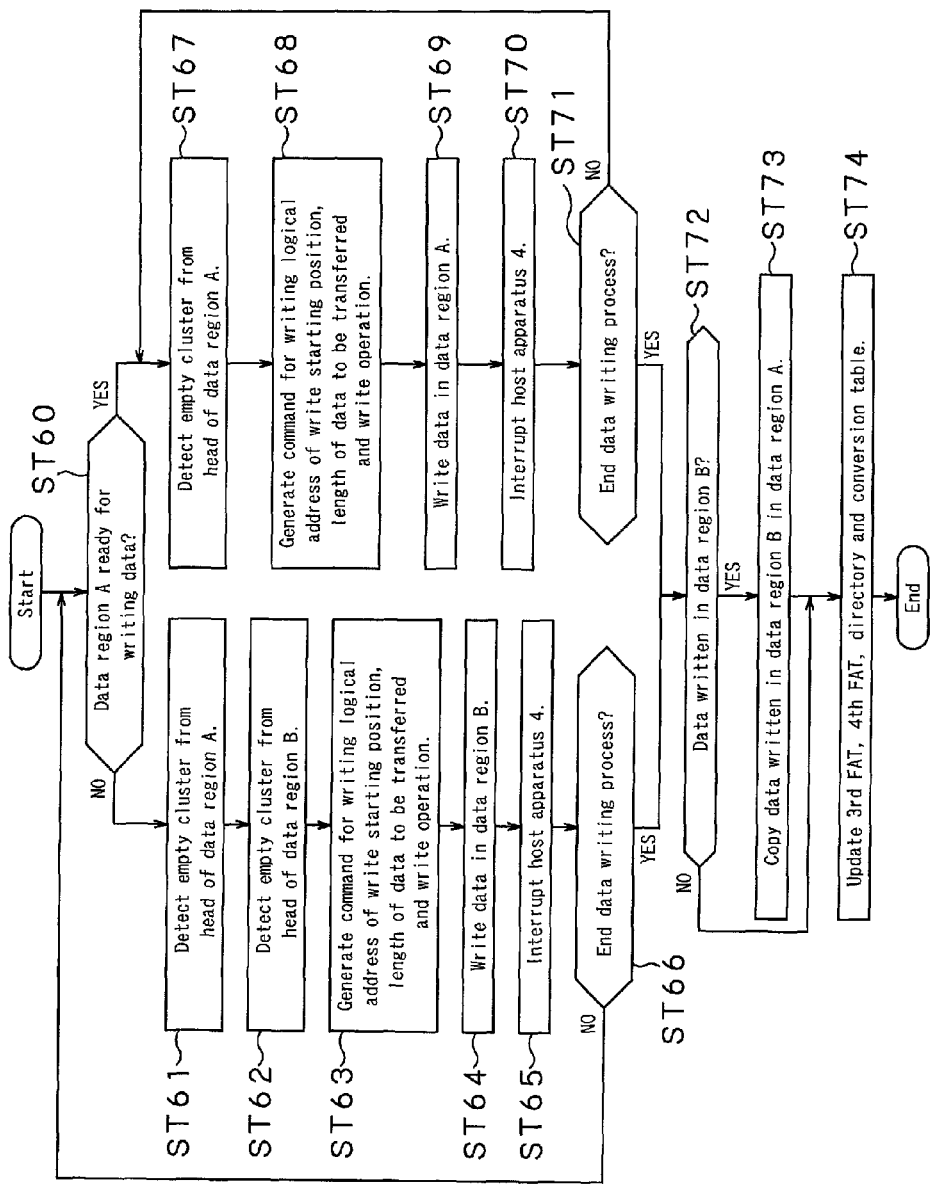
FIG. 13 is a fifth flowchart of the operation of writing the data supplied from a host apparatus in the composite type recording apparatus of FIG. 1.

Referring to FIG. 13, the composite type recording apparatus 1 determines if the data region A is ready for a data writing operation or not in Step ST60. The operation proceeds to Step ST61 when the data region A is not ready for a data writing operation, whereas it proceeds to Step ST67 when the data region A is ready for a data writing operation.

As pointed out above, several seconds are necessary for the recording medium 2 from the time when it is driven to rotate by the drive section 21 under the control of the servo control section 22 to the time when it rotates at a predetermined number of revolutions per unit time and becomes ready for a data writing operation. Therefore, the composite type recording apparatus 1 controls the data allocation section 16 so as to write the data supplied from the dedicated apparatus in the data region B of the non-volatile storage medium 3 until the data region A becomes ready for a data writing operation and, when the data region A becomes ready for a data writing operation, it controls the data allocation section 16 so as to write the data supplied from the dedicated apparatus in the data region A of the recording medium 2.

In Step ST61, the composite type recording apparatus 1 detects an empty cluster from the head of the data region A. The processing unit 14 reads out the third FAT from the data region B and develops the third FAT it reads out in the RAM. The processing unit 14 moves the selection pointer to the position of a predetermined logical address of the second FAT developed in the RAM and then starts retrieving identification information indicating an empty region from the predetermined logical address toward the tail end logical address.

In Step ST62, the composite type recording apparatus 1 detects an empty cluster from the head of the data region B. The processing unit 14 reads out the fourth FAT from the data region B and develops the fourth FAT it reads out in the RAM. The processing unit 14 recognizes that the host apparatus 4 is a dedicated apparatus according to the outcome of recognition supplied from the apparatus recognizing section 13. Then, the processing unit 14 moves the selection pointer to the position of the predetermined address of the third FAT and the fourth FAT developed in the RAM and starts retrieving identification information indicating an empty region from the predetermined logical address toward tail end logical address by means of the selection pointer. Then, the processing unit 14 generates a conversion table in which the logical address indicating an empty region in the third FAT and the logical address indicating an empty region in the fourth FAT are associated with each other. The generated conversion table is then stored in a predetermined area of the data region B.

In Step ST63, the processing unit 14 supplies the logical address in the empty region that is detected from the fourth FAT and at which a write operation is to be started and the length of the data to be transferred to the conversion section 15. The processing unit 14 also generates a command ordering a write operation and supplies it to the conversion section 15.

In Step ST64, the composite type recording apparatus 1 writes the data in the data region that corresponds to the predetermined memory address of the data region B. The conversion section 15 converts the logical address supplied from the processing unit 14 into a memory address according to the address conversion table and supplies the memory address produced as a result of the conversion to the memory section 11. Additionally, the conversion section 15 notifies the data allocation section 16 that the logical address supplied from the processing unit 14 is converted into a memory address.

The data allocation section 16 allocates the data supplied by way of the interface section 12 to the memory section 11 in response to the notification from the conversion section 15. Then, the memory section 11 executes a process of writing the data supplied from the data allocation section 16 in the data region B by the amount corresponding to the data transfer length according to the memory address supplied from the conversion section 15.

In Step ST65, the composite type recording apparatus 1 interrupts the host apparatus 4. That is, the composite type recording apparatus 1 interrupts the host apparatus 4 after writing the data in the data region B by the amount corresponding to the data transfer length.

In Step ST66, the composite type recording apparatus 1 determines if it ends the data writing process or not. The composite type recording apparatus 1 proceeds to Step ST72 when it ends the data writing process but it returns to Step ST60 when it continues the data writing process. If the composite type recording apparatus 1 returns to Step ST60 and the data region A is not ready for a data writing operation, the composite type recording apparatus 1 repeats Step S61 through Step ST65.

In Step ST67, the composite type recording apparatus 1 detects an empty cluster from the head of the data region A. The processing unit 14 moves the selection pointer to the position of predetermined logical address of the third FAT developed in the RAM. Then, it starts retrieving identification information indicating an empty region from the leading logical address toward the tail end logical address by means of the selection pointer.

Alternatively, the processing unit 14 may proceed to Step S67 when it receives information from a monitor section (not shown) monitoring the activated state of the recording medium 2 telling that the data region A is ready for a data writing operation.

In Step ST68, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST69, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST70, the composite type recording apparatus 1 interrupts the host apparatus 4. That is, the composite type recording apparatus 1 interrupts the host apparatus 4 after writing the data in the data region B by the amount corresponding to the data transfer length.

In Step ST71, the composite type recording apparatus 1 determines if it ends the data writing process or not. The composite type recording apparatus 1 proceeds to Step ST72 when it ends the data writing process but it returns to Step S67 and repeats Step ST68 through Step ST71 when it continues the data writing process.

In Step ST72, the composite type recording apparatus 1 determines if any data is written in the data region B. The composite type recording apparatus 1 proceeds to Step ST73 when data is written in the data region B but it proceeds to Step ST74 when no data is written in the data region B. The composite type recording apparatus 1 determines if any data is written in the data region B or not by referring to the conversion table it generates in Step ST62.

Figure 12:
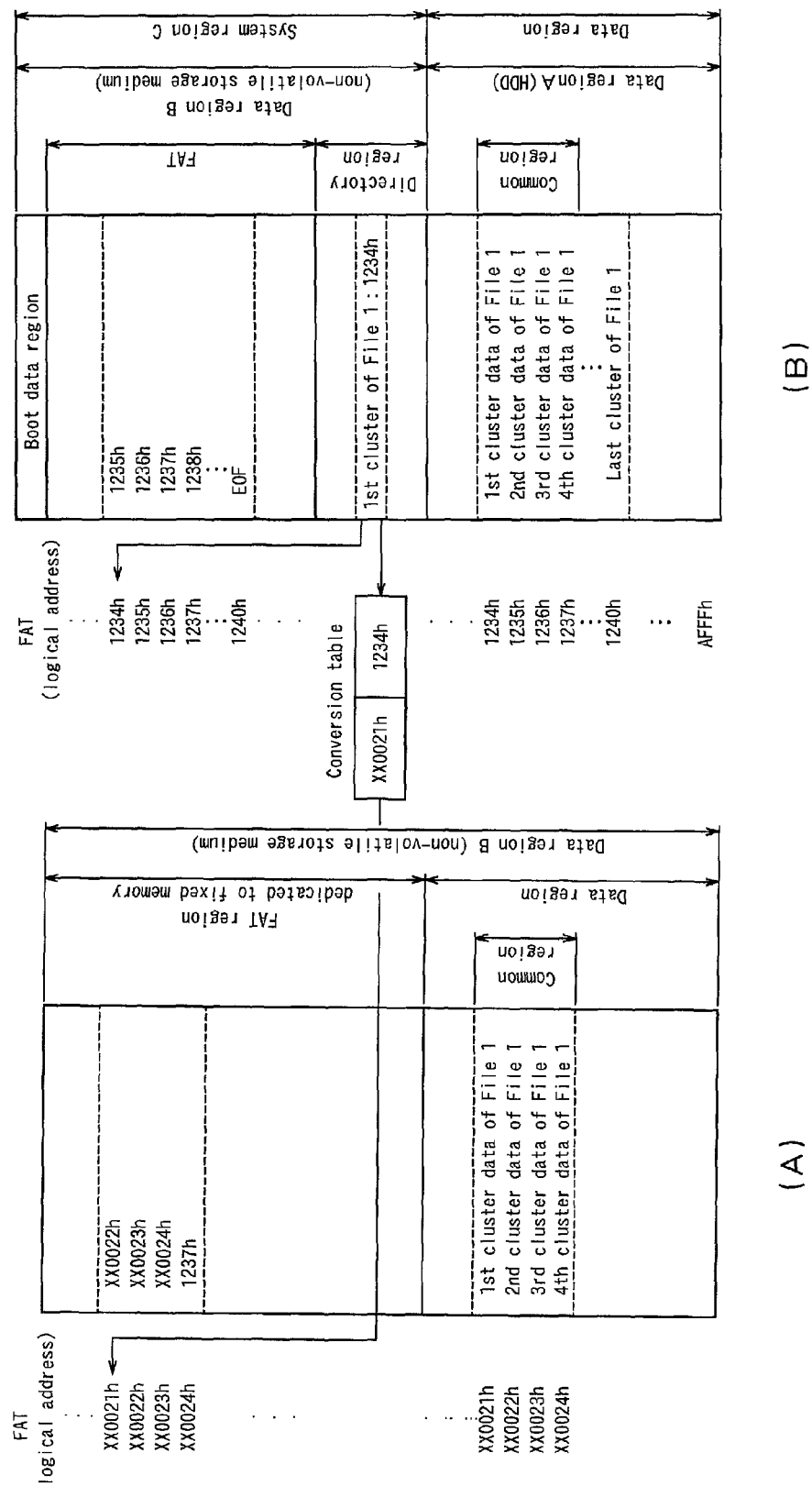
FIG. 12 is a schematic illustration of a third configuration of data region A and data region B.

In Step ST73, the composite type recording apparatus 1 copies the data written in the data region B in Step ST61 through ST63 in the data region A. For example, if the data are written at memory addresses XX0021h through XX0024h of the data region B as shown in FIG. 12, the composite type recording apparatus 1 reads out the data written at memory addresses XX0021h through XX0024h and copies the data it reads out at predetermined physical addresses (1234h through 1237h) of the data region A, referring to the conversion table generated in Step ST62.

In Step ST74, the composite type recording apparatus 1 updates the third FAT, the fourth FAT, the directory and the conversion table generated in Step ST62 in response to the new data written in the data region B in Step ST61 through Step ST63 and the new data written in the data region A in Step ST66 through Step ST68.

Now, a data writing process that the composite type recording apparatus 1 executes when a general purpose apparatus is connected to the interface section 12 will be described below by referring to the flowchart of FIG. 14.

Figure 14:
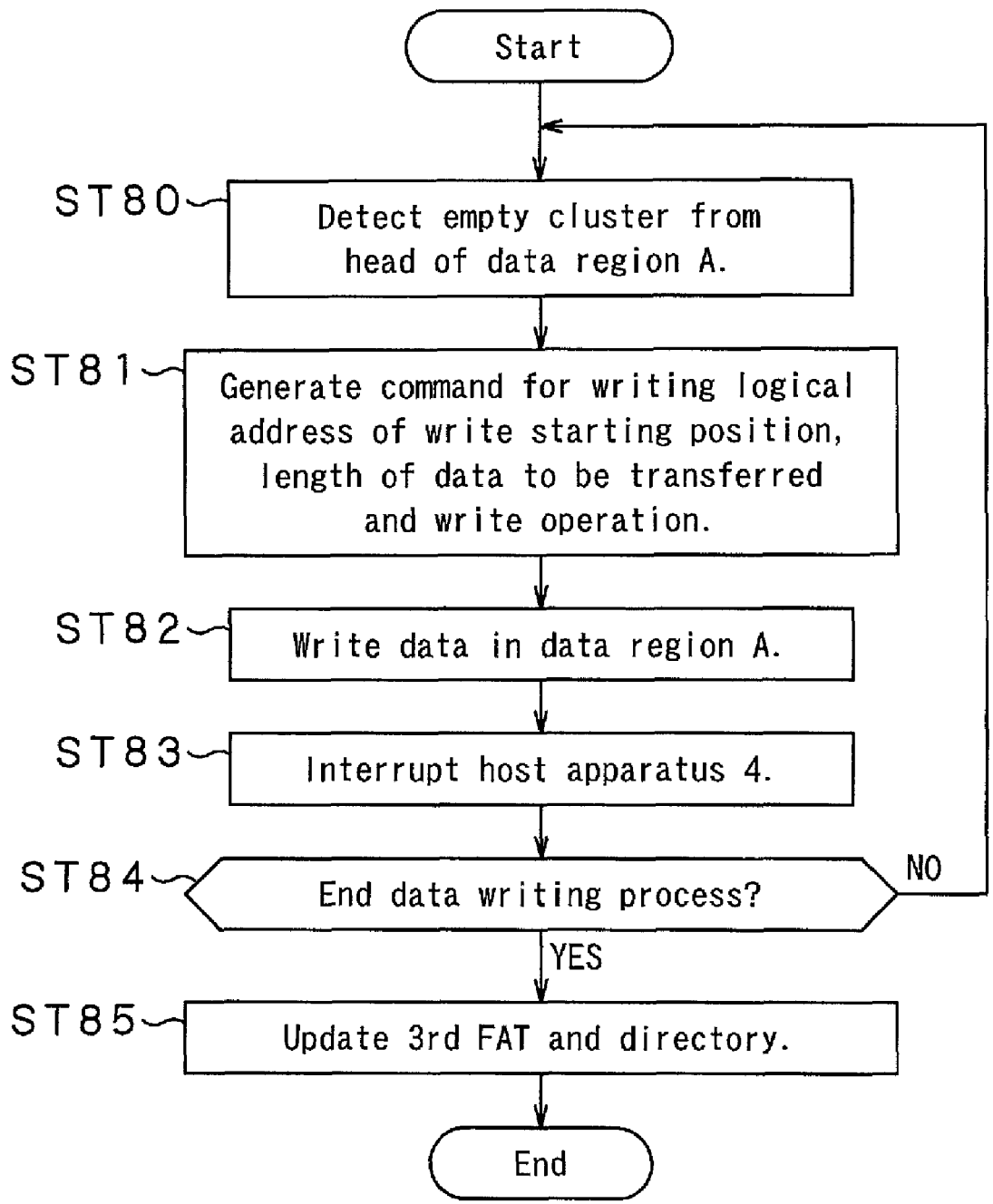
FIG. 14 is a sixth flowchart of the operation of writing the data supplied from a host apparatus in the composite type recording apparatus of FIG. 1.

Referring to FIG. 14, the composite type recording apparatus 1 detects an empty cluster from the head of the data region A in Step ST80. More specifically, the composite type recording apparatus 1 waits until the data region A becomes ready for a data writing operation and then detects an empty cluster from the head of the data region A.

The processing unit 14 reads out the third FAT from the data region B and develops the third FAT it reads out in the RAM. Then, the processing unit 14 moves the selection pointer to the predetermined logical address of the third FAT developed in the RAM and starts retrieving identification information indicating an empty region from the predetermined logical address toward the tail end logical address by means of the selection pointer.

In Step ST81, the processing unit 14 supplies the logical address in the detected empty region at which a write operation is to be started and the length of the data to be transferred to the conversion section 15. The processing unit 14 also generates a command ordering a write operation and supplies it to the conversion section 15.

In Step ST82, the composite type recording apparatus 1 writes the data in the data region that corresponds to the predetermined physical address of the data region A. The conversion section 15 converts the logical address supplied from the processing unit 14 into a physical address according to the address conversion table and supplies the physical address produced as a result of the conversion to the HDD 10. Additionally, the conversion section 15 notifies the data allocation section 16 that the logical address supplied from the processing unit 14 is converted into a physical address.

The data allocation section 16 allocates the data supplied by way of the interface section 12 to the HDD 10 in response to the notification from the conversion section 15. Then, the HDD 10 executes a process of writing the data supplied from the data allocation section 16 in the data region A by the amount corresponding to the data transfer length according to the physical address supplied from the conversion section 15.

In Step ST83, the composite type recording apparatus 1 interrupts the host apparatus 4. That is, the composite type recording apparatus 1 interrupts the host apparatus 4 after writing the data in the data region A by the amount corresponding to the data transfer length.

In Step ST84, the composite type recording apparatus 1 determines if it ends the data writing process or not. The composite type recording apparatus 1 proceeds to Step ST85 when it ends the data writing process but it returns to Step ST80 and repeats Step ST80 through Step ST84 when it continues the data writing process.

In Step ST85, the composite type recording apparatus 1 updates the third FAT and the directory in response to the new data written in the data region A.

The steps from Step ST60 to Step ST74 and the steps from Step ST80 to Step ST85 may be programmed so that the composite type recording apparatus 1 may execute data writing operations by causing a computer to execute the program.

In this way, the composite type recording apparatus 1 includes a third FAT for managing the data region A, which third FAT is open to the outside, and a fourth FAT for managing the data region B, which fourth FAT is to be used only in the inside of the medium, and is adapted to restrict write operations depending on the type of the host apparatus 4 and copy the data written in the data region B in the data region A after the end of the data writing operation so that a general purpose apparatus can neither write data in nor read data from the data region B. Therefore, after data are written in a composite type recording apparatus 1 by a general purpose apparatus, a dedicated apparatus can write data in the composite type recording apparatus 1, exploiting both the characteristic features of a recording medium 2 that operates at low bit cost and those of a non-volatile storage medium 3 that are advantageous in terms of quick responsiveness, low power consumption rate and so on.

Additionally, the composite type recording apparatus 1 according to the embodiment of the present invention has only to read data written in the data region A in a data reproducing operation so that the data written by a dedicated apparatus can be read out by a general purpose apparatus and vice versa.

While the above-described first through third embodiments of composite type recording apparatus are adapted to record moving images instantaneously, the present invention is by no means limited thereto so long as it includes a recording medium 2 that operates at low bit cost and a non-volatile storage medium 3 that are advantageous in terms of quick responsiveness and low power consumption rate. For example, while the recording medium 2 consumes electric power to a large extent when it is activated and when it is in a standby status, the power consumption rate can be suppressed and the service life of the power source can be prolonged when it is so arranged that data of a file that is activated at high speed, processed for replacement or accessed frequently or a small capacity file are constantly written in the non-volatile storage medium 3.

The composite type recording apparatus 1 can be so arranged that the operation of managing the FAT or FATs is conducted in the inside of the recording medium 2 to reduce the load of the host apparatus. Such an arrangement provides an advantage that the host apparatus 4 does not have to take the FAT or FATs into consideration if the capacity of the data region A and that of the data region B are increased.

When the host apparatus 4 has functional features same as those of the apparatus recognizing section 13, the processing unit 14 and the conversion section 15, it may be so arranged that the host apparatus 4 performs the operations of the operation recognizing section 12(?), the apparatus recognizing section 13, the processing unit 14 and the conversion section 15.

Figure 15:
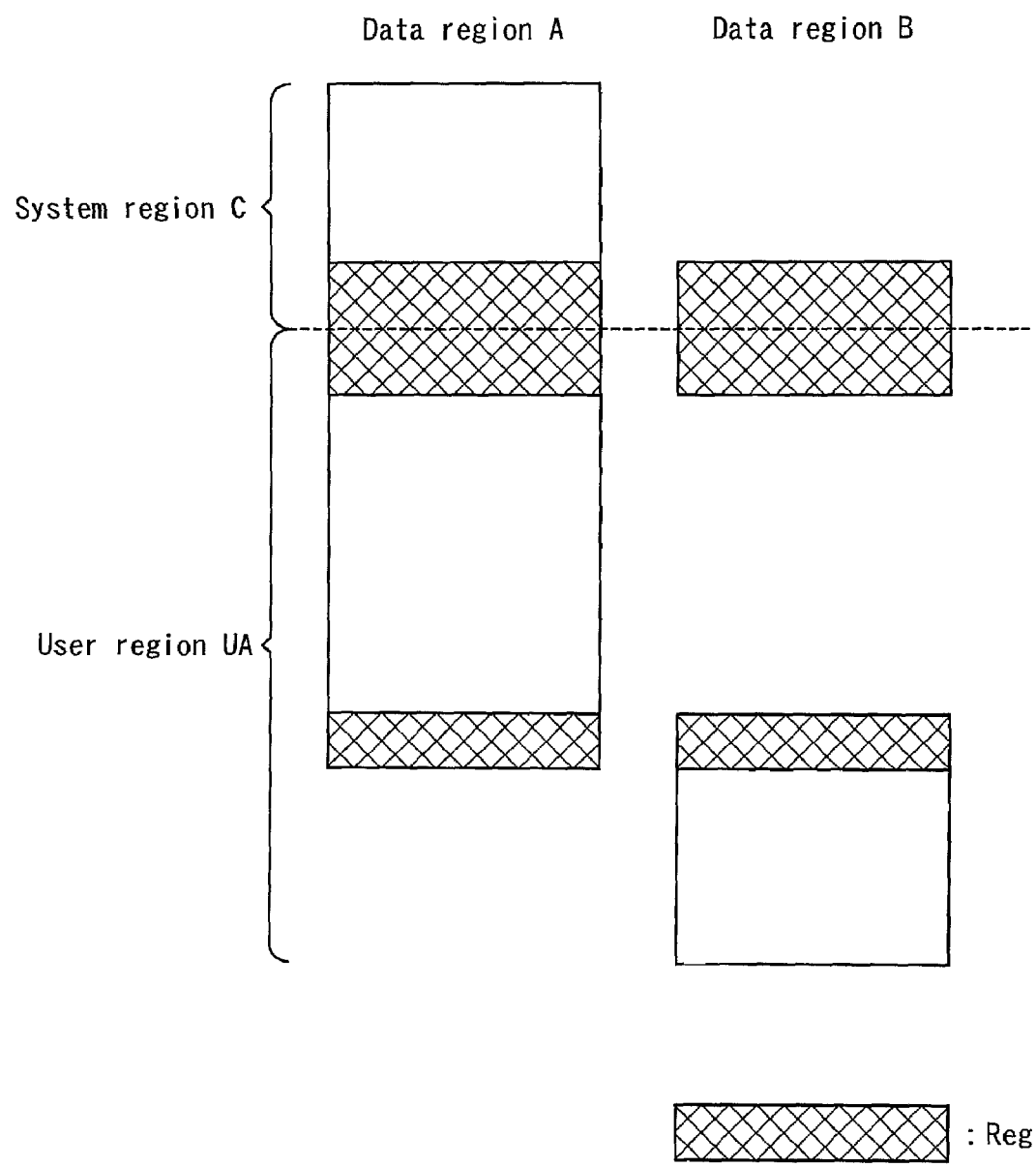
FIG. 15 is a schematic illustration of regions X formed by part of the region of the recording medium and part of the region of the non-volatile storage medium to which an LBA is affixed in duplicate.

As pointed out above, the host apparatus 4 accesses the composite type recording apparatus 1, using not logical section numbers (LSN) but logical block addresses (LBA). Thus, in the present invention, regions X where LBAs are affixed in duplicate may be formed by part of the region of the recording medium 2 and by part of the region of the non-volatile storage medium 3 as shown in the conceptual illustration in FIG. 15. While regions X are formed in the system region C and the integrated data region in FIG. 15, regions X may alternatively be formed only in the system region C.

The data allocation section 16 operates to automatically record the information written in the FAT region(s) and the directory region in the regions X.

Thus, when regions X are formed in the system region C in the composite type recording apparatus 1, the FAT is or the FATs are recorded both in the recording medium 2 and in the non-volatile storage medium 3 to make it possible to build a stable and secure system.

While the recording medium 2 is assumed to be a hard disc drive in the above-described embodiments, any randomly accessible storage medium may be used for the recording medium 2. For example, it may alternatively be a CD or a DVD.

While a FAT file system is used as file system for managing the data regions of the composite type recording apparatus 1 in the above description, it may be replaced by some other system so long as such a system can manage data as files.

The above-described series of processes of the composite type recording apparatus 1 may be executed by software. When the series of processes are executed by software, a program is installed typically in a general purpose computer as software. The program may be recorded in removable mediums such as CD-ROMs and distributed to users or downloaded to the computers of users by way of a network for distribution.

It should be understood by those skilled in the art that various modifications combinations, sub-combinations and alterations may occur depending on design requirements and other factors insofar as they are within the scope of the appended claims or the equivalents thereof.

What is claimed is:

1. A composite type recording apparatus comprising:
a recording medium having a first data region with a plurality of first physical addresses affixed thereto;
a non-volatile storage medium having a second data region with a plurality of second physical addresses affixed thereto;
an interface section connectable to a host apparatus;
a recognition unit that determines if the host apparatus is connected to the interface section and that generates a recognition result indicating whether the host apparatus connected to the interface section is (i) a host apparatus capable of recognizing and discriminating between the recording medium and the non-volatile storage medium or (ii) a host apparatus incapable of recognizing and discriminating between the recording medium and the non-volatile storage medium; and
an information selection unit that selects a logical address according to the recognition result;
a conversion unit that converts the logical address selected by the information selection unit according to the recognition result into a first physical address associated with the first data region or second physical address associated with the second data region;
a data allocation unit that allocates data supplied from the host apparatus connected to the interface section to the first data region or the second data region according to an outcome of the conversion by the conversion unit; and
a write unit that (i) writes the data allocated to the first data region by the data allocation unit at a predetermined location of the first data region according to the first physical address and (ii) writes the data allocated to the second data region by the data allocation unit at a predetermined location of the second data region according to the second physical address.

2. The apparatus according to claim 1, wherein:
the information selection unit selects the logical address from logical addresses that correspond to the first data region when the recognition result generated by the recognition unit indicates that the host apparatus connected to the interface section is the host apparatus incapable of recognizing and discriminating between the recording medium and the non-volatile storage medium, and
the information selection unit selects a logical address from logical addresses that correspond to the second data region when the recognition result generated by the recognition unit indicates that the host apparatus connected to the interface section is the host apparatus capable of recognizing and discriminating between the recording medium and the non-volatile storage medium.

3. A composite type recording apparatus comprising:
a recording medium having a first data region with a plurality of first physical addresses affixed thereto;
a non-volatile storage medium having a second data region with a plurality of second physical addresses affixed thereto;
an interface section connectable to a host apparatus;
a recognition section that recognizes the host apparatus connected to the interface section and that generates a recognition result indicating whether the host apparatus connected to the interface section is (i) a host apparatus capable of recognizing and discriminating between the recording medium and the non-volatile storage medium or (ii) a host apparatus incapable of recognizing and discriminating between the recording medium and the non-volatile storage medium;
an information selection section that selects a logical address according to the recognition result;
a conversion section that converts the logical address selected by the information selection section according to the recognition result into a first physical address associated with the first data region or a second physical address associated with the second data region;
a data allocation section that allocates data supplied from the host apparatus connected to the interface section to the first data region or the second data region according to an outcome of the conversion by the conversion section; and
a write section that (i) writes the data allocated to the first data region by the data allocation section at a predetermined location of the first data region according to the first physical address and (ii) writes the data allocated to the second data region by the data allocation section at a predetermined location of the second data region according to the second physical address.

* * * * *